(12) United States Patent
Luo et al.

(10) Patent No.: US 10,803,171 B2
(45) Date of Patent: Oct. 13, 2020

(54) VIRUS DETECTION METHOD, TERMINAL AND SERVER

(71) Applicant: TENCENT TECHNOLOGY (SHENZHEN) COMPANY LIMITED, Shenzhen, Guangdong (CN)

(72) Inventors: Yuan Hai Luo, Guangdong (CN); Jia Bin Wang, Guangdong (JP)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 25 days.

(21) Appl. No.: 15/988,131

(22) Filed: May 24, 2018

(65) Prior Publication Data
US 2018/0268139 A1   Sep. 20, 2018

Related U.S. Application Data

(63) Continuation of application No. PCT/CN2017/082134, filed on Apr. 27, 2017.

(30) Foreign Application Priority Data

May 4, 2016  (CN) .......................... 2016 1 0293279

(51) Int. Cl.
*G06F 21/56* (2013.01)
*H04L 29/06* (2006.01)

(52) U.S. Cl.
CPC .......... *G06F 21/564* (2013.01); *G06F 21/563* (2013.01); *H04L 63/145* (2013.01); *H04L 63/20* (2013.01); *H04L 63/1416* (2013.01)

(58) Field of Classification Search
CPC ....... G06F 21/564; G06F 21/563; H04L 63/20
See application file for complete search history.

(56) References Cited

U.S. PATENT DOCUMENTS

| 7,260,226 B1* | 8/2007 | Miura ...................... H04N 5/76 381/56 |
| 8,935,788 B1* | 1/2015 | Diao ..................... G06F 21/561 726/24 |

(Continued)

FOREIGN PATENT DOCUMENTS

| CN | 1752888 A | 3/2006 |
| CN | 101621511 A | 1/2010 |

(Continued)

OTHER PUBLICATIONS

Ai-Fen Sui, et al., Network behavior based mobile virus detection, Nov. 2012, 2012 IEEE 14th International Conference on Communication Technology, pp. 1-5.*

(Continued)

*Primary Examiner* — Farid Homayounmehr
*Assistant Examiner* — Raied A Salman
(74) *Attorney, Agent, or Firm* — Sughrue Mion, PLLC

(57) ABSTRACT

A virus detection method, a terminal, and a server are provided. The method includes performing preprocessing on an obtained to-be-processed file according to a preset policy, to obtain a part that is in the to-be-processed file and whose stability is greater than a first threshold as effective information. The effective information is calculated to obtain a first characteristic parameter value. The first characteristic parameter value is transmitted to a server for performing detection by means of virus comparison, and a detection result of the virus comparison is received. Virus scanning is performed on a local file according to the detection result.

11 Claims, 21 Drawing Sheets

(56) References Cited

U.S. PATENT DOCUMENTS

| | | | | |
|---|---|---|---|---|
| 9,135,442 B1* | 9/2015 | Kennedy | ............... | G06F 21/563 |
| 2005/0071649 A1* | 3/2005 | Shipp | ................... | G06F 21/563 |
| | | | | 713/188 |
| 2005/0172339 A1* | 8/2005 | Costea | ................. | H04L 63/145 |
| | | | | 726/22 |
| 2015/0096023 A1* | 4/2015 | Mesdaq | ............... | G06F 21/566 |
| | | | | 726/23 |
| 2018/0375471 A1* | 12/2018 | Yang | ................. | G01R 19/2513 |

FOREIGN PATENT DOCUMENTS

| | | | | | |
|---|---|---|---|---|---|
| CN | 101887498 | A | | 11/2010 | |
| CN | 102594809 | A | | 7/2012 | |
| CN | 102799804 | A | | 11/2012 | |
| CN | 103020520 | A | | 4/2013 | |
| CN | 103020524 | A | | 4/2013 | |
| CN | 103049695 | A | | 4/2013 | |
| CN | 103164651 | A | | 6/2013 | |
| CN | 103514404 | A | | 1/2014 | |
| CN | 103761475 | A | | 4/2014 | |
| CN | 103886229 | A | | 6/2014 | |
| CN | 103886258 | A | | 6/2014 | |
| CN | 103886258 | A | * | 6/2014 | ............ G06F 21/56 |
| CN | 104077532 | A | | 10/2014 | |
| CN | 104598818 | A | | 5/2015 | |
| CN | 104700033 | A | * | 6/2015 | |
| CN | 104700033 | A | | 6/2015 | |
| CN | 104809394 | A | | 7/2015 | |
| CN | 104915596 | A | * | 9/2015 | ........... G06F 21/564 |

OTHER PUBLICATIONS (All2All, Recovering From and Preventing an Iframe Virus Attack on Your Website, Sep. 17, 2010, http://www.all2all.be/files/pdfs/manual_iframevirus.pdf, pp. 1-7, hereinafter All2All).*
(Jianguo Ren, et al., Propagation Effect of a Virus Outbreak on a Network with Limited Anti-Virus Ability, Sep. 2014, https://www.researchgate.net/publication/285575922_Stability_and_Bifurcation_of_a_Computer_Virus_Propagation_Model_with_Delay_and_Incomplete_Antivirus_Ability, pp. 1-11, hereinafter Ren).*
(Neil Archibald, Extracting EXE Drop Malware, Jul. 2011, https://blogs.cisco.com/security/extracting-exe-drop-malware, pp. 1-9, hereinafter Archibald).*
(TutorialsPoint, HTML—Iframes, Sep. 11, 2014, https://www.tutorialspoint.com/html/html_iframes.htm, pp. 1-9, hereinafter TutorialsPoint).*
Gao Lin, et al., Analysis on code stability and fault tolerance, Aug. 8-10, 2011, 2011 2nd International Conference on Artificial Intelligence, Management Science and Electronic Commerce (AIMSEC), pp. 1-5.*
International Search Report for PCT/CN2017/082134 dated, Jun. 29, 2017 (PCT/ISA/210).
Communication dated Oct. 16, 2019 from the State Intellectual Property Office of the P.R.C. in application No. 201610293279.6.
Communication dated Dec. 31, 2019 from the State Intellectual Property Office of the P.R.C. in counterpart Application No. 201610293279.6.
Written Opinion of the International Searching Authority for PCT/CN2017/082134 dated Jun. 29, 2017 [PCT/ISA/237].
Communication dated Feb. 26, 2020 by The State Intellectual Property Office of P.R. of China in application No. 201610293279.6.

* cited by examiner

VIRUS DETECTION METHOD, TERMINAL AND SERVER

CROSS-REFERENCE TO RELATED APPLICATIONS

This application is a continuation of International Patent Application No. PCT/CN2017/082134, filed on Apr. 27, 2017, which claims priority to Chinese Patent Application No. 201610293279.6, entitled "VIRUS DETECTION METHOD, TERMINAL, AND SERVER" filed with the Patent Office of China on May 4, 2016, the disclosures of each of which are incorporated by reference herein in their entirety.

BACKGROUND

1. Field

The present disclosure relates to detection technologies, and in particular, to a virus detection method, a terminal, and a server.

2. Description of the Related Art

With development of intelligent terminals, it is very common for one person to have an intelligent terminal. Most life services may be implemented by means of applications installed on intelligent terminals or by means of networking, which brings a lot of convenience to users. However, while the convenience is increased, hidden security hazards also exist, and a networking process would easily be invaded by a virus. In a process of fighting against an virus, it is very important to find the virus as early as possible. Finding and handling the virus early can reduce loss of user data and ensure information security of a fund account, privacy information, and the like of the user. Several related art methods for detecting a virus include: a characteristic code matching method, a behavior monitoring method, a software simulation method, and the like. According to different principles of the methods, system overheads occupied for implementing virus detection are different, and detection scopes are different. The methods have different advantages. The characteristic code matching method is a relatively common method. However, a related art characteristic code matching method cannot accurately effectively detect a variant of a virus. Consequently, accuracy of virus detection is affected, and information security of a fund account, privacy information, and the like of a user cannot be ensured. There is still no solution to the problem.

SUMMARY

It is an aspect to provide a virus detection method, a terminal, and a server, to at least resolve the problems existing in the related art technology.

According to an aspect of one or more exemplary embodiments, a method is provided. The method includes performing preprocessing on an obtained to-be-processed file according to a preset policy, to obtain a part that is in the to-be-processed file and whose stability is greater than a first threshold as effective information; calculating the effective information to obtain a first characteristic parameter value; sending transmitting the first characteristic parameter value to a server for performing detection by means of virus comparison; and receiving a detection result of the virus comparison, and performing virus scanning on a local file according to the detection result.

According to other aspects of one or more exemplary embodiments, there is provided other methods and a terminal consistent with the method.

BRIEF DESCRIPTION OF THE DRAWINGS

Exemplary embodiments will be described below with reference to the accompanying drawings, in which.

DETAILED DESCRIPTION

The following further describes implementation of technical solutions in detail with reference to the accompanying drawings.

Figure 1:
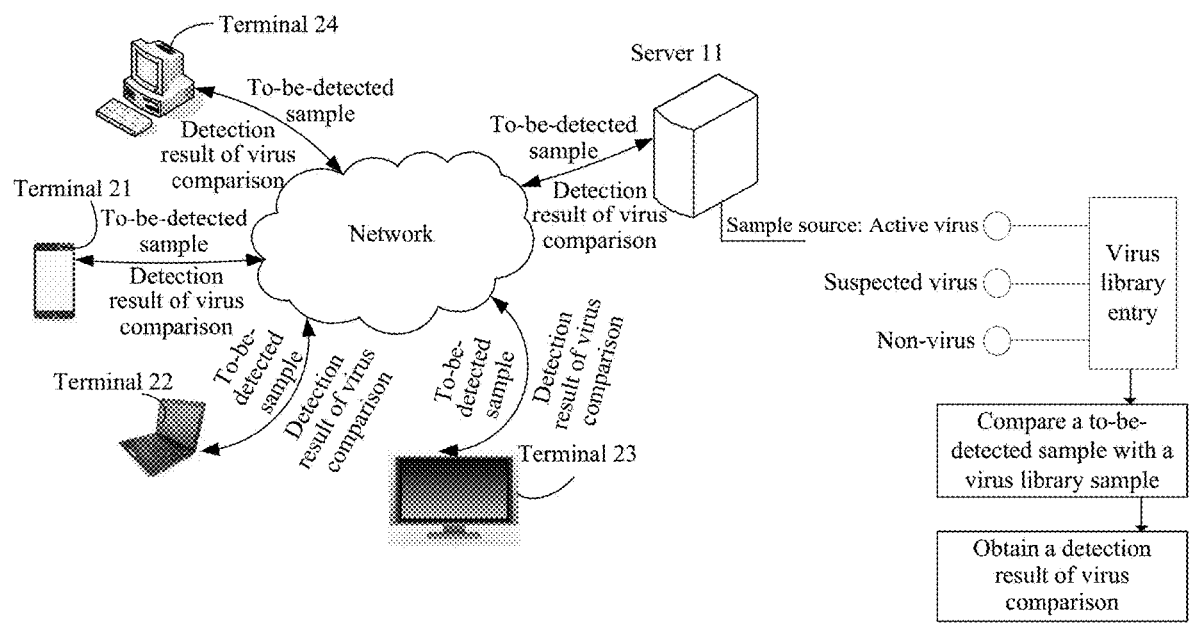
FIG. 1 is a schematic diagram of hardware entities of respective parties performing information exchange, according to exemplary embodiments.

The virus detection method of the exemplary embodiments includes: performing preprocessing on an obtained to-be-processed file according to a preset policy, to obtain a part that is in the to-be-processed file and whose stability is greater than a first threshold as effective information; calculating the effective information to obtain a first characteristic parameter value; sending the first characteristic parameter value to a server for performing detection by means of virus comparison; and receiving a detection result of the virus comparison, and performing virus scanning on a local file according to the detection result of the virus comparison. By means of the exemplary embodiments, a variant of a virus may be accurately and effectively detected, so as to improve accuracy of virus detection and ensure information security of a fund account, privacy information, and the like of a user FIG. 1 is a schematic diagram of hardware entities of respective parties performing information exchange in an exemplary embodiment. In FIG. 1, a server 11 and terminal devices 21-24 are included, and the terminal devices 21-24 perform information exchange by means of a wired network or a wireless network and the server. Types of the terminal device include a mobile phone, a desktop computer, a PC, an integrated machine, and the like. Applications, such as a game application, a map navigation application, a high speed rail line application, and a virus killing application are installed in the terminal devices.

According to exemplary embodiments, based on the system shown in FIG. 1, a terminal performs preprocessing on an obtained to-be-processed file (a file on which virus detection needs to be performed) according to a preset policy, to obtain effective information against invasion of a virus variant. The effective information has stability. The effective information obtained after the preprocessing is the most stable information in the to-be-processed file, and this type of information is a part that a virus writer can hardly bypass and cannot easily change. Therefore, the information is used as effective information against invasion of a virus variant. The effective information is a to-be-detected sample reported by the terminal to the server in FIG. 1. In a specific application, fuzzy hash value calculation may be further performed on the to-be-detected sample, to report a calculation result to the server as a first fuzzy hash value for performing virus detection comparison. Distribution of bytes constituting the effective information conforms to a specified rule (that is, the information satisfies the foregoing stability requirement and is the most stable information in the to-be-processed file).

The server performs preprocessing on a virus library sample file according to the preset policy, to obtain to-be-compared information in the virus library sample file. Distribution of bytes constituting the to-be-compared information conforms to a specified rule. Specifically, the server performs preprocessing on a virus sample file in an existing virus library sample file, and the preprocessing is also performed by using a preset policy the same as that on the terminal side. An objective is to intercept, from the virus library sample file, data whose characteristics are the same as those in the to-be-detected sample reported by the terminal for performing comparison, so that accuracy of the comparison is improved. In specific application, fuzzy hash value calculation may be further performed on the virus sample file, and virus detection comparison is performed on a calculation result that is used as a second fuzzy hash value and the calculation result reported by the terminal, that is, the first fuzzy hash value. The first fuzzy hash value is a first characteristic parameter value calculated by the terminal according to the effective information (the to-be-detected sample), and the second fuzzy hash value is a second characteristic parameter value calculated by the server according to the to-be-compared information (the virus sample). The server determines similarity between the first characteristic parameter value and the second characteristic parameter value, to obtain a determination result. When the determination result satisfies a threshold, the to-be-detected sample is regarded as a suspected virus, and after comparison with a specified quantity of or all virus library sample files is ended, the server determines that the suspected virus is a virus or a non-virus, and sends the determination as a detection result of virus comparison to the terminal. The terminal receives the detection result of the virus comparison, and fully or partially scans local files for virus killing according to the detection result of the virus comparison.

Figure 2:
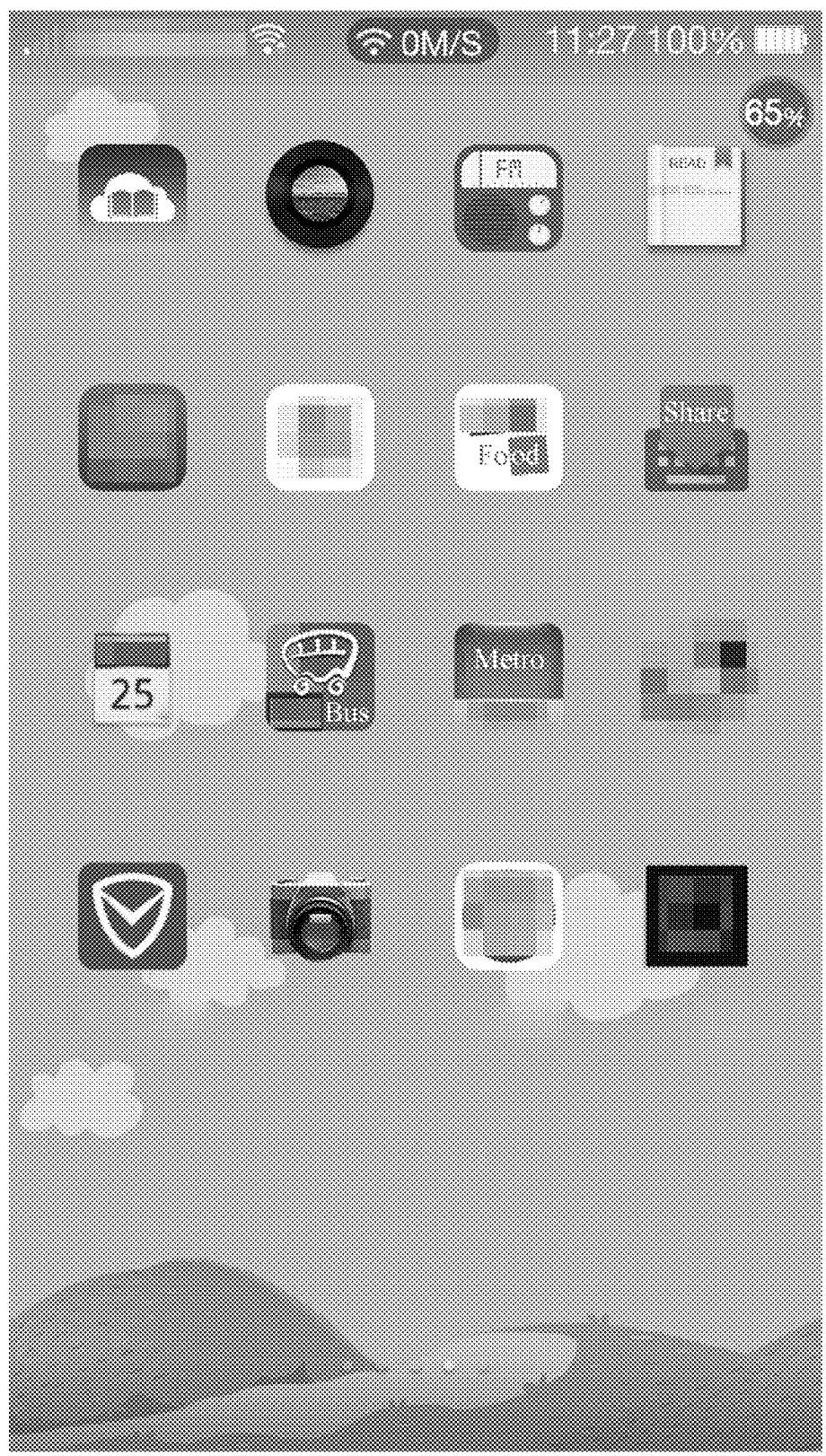
FIG. 2 to FIG. 7 are schematic diagrams of examples of a plurality of UI interfaces of a virus killing application according to exemplary embodiments.
Figure 3:
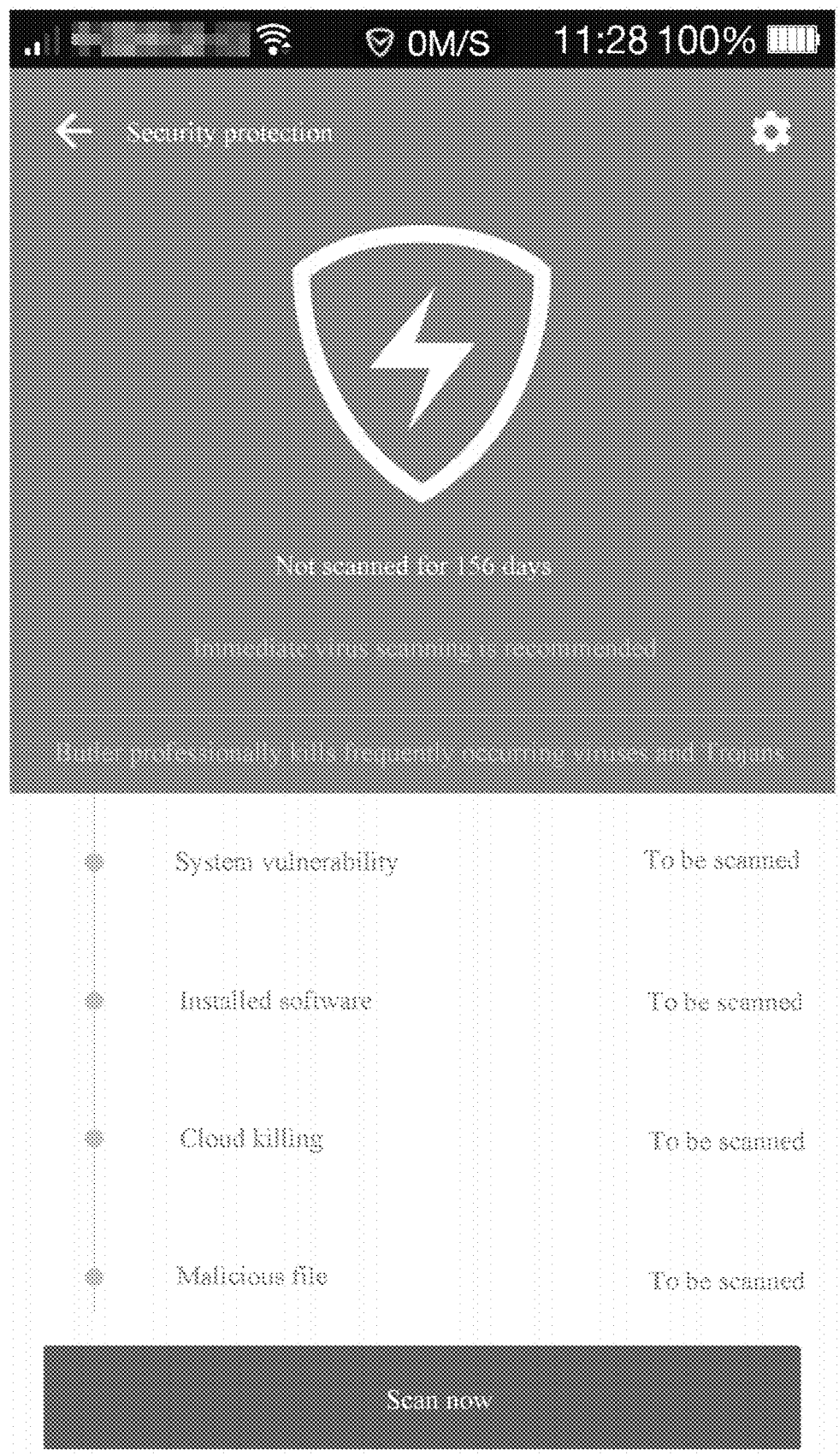
Figure 4:
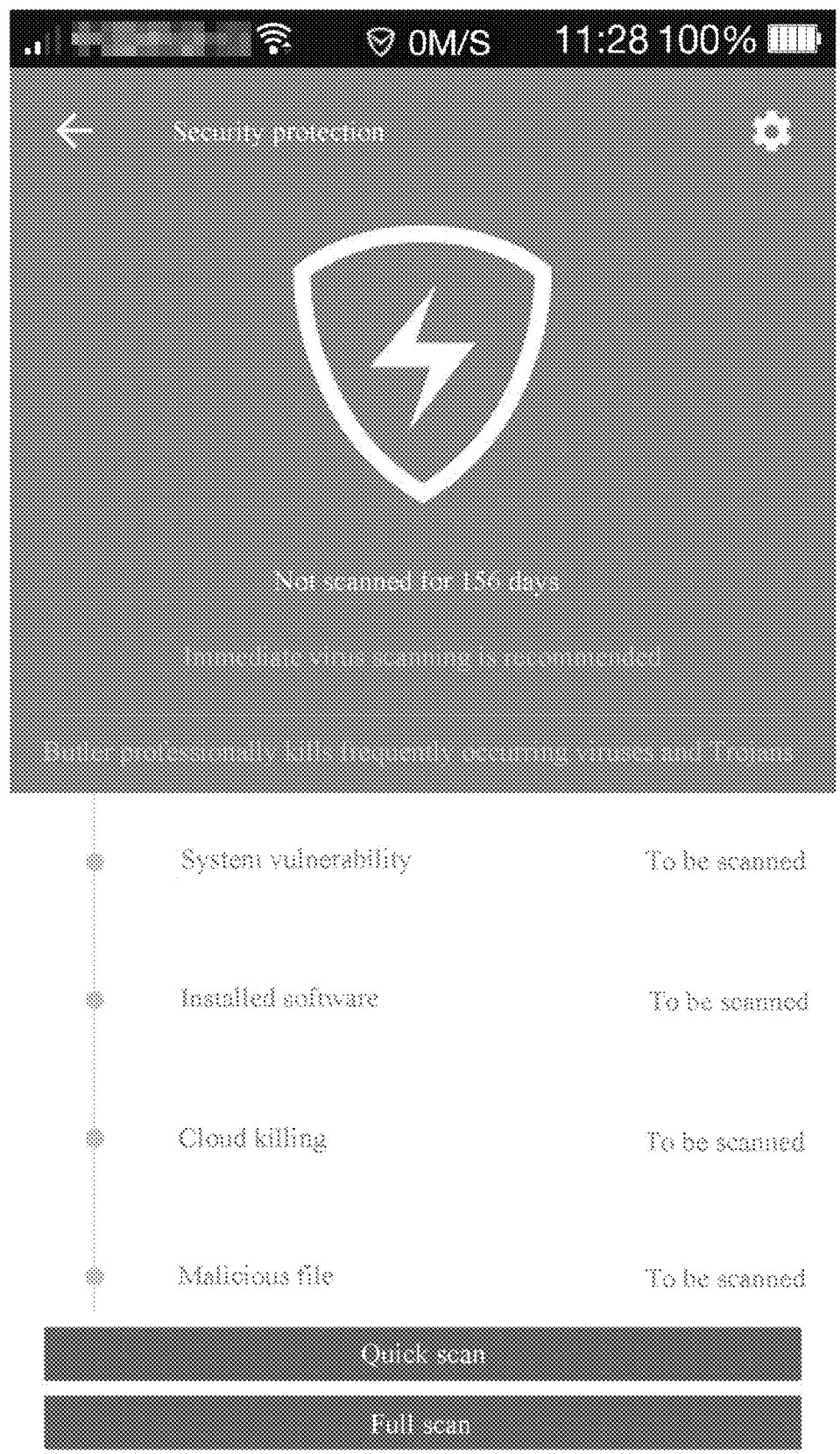
Figure 5:
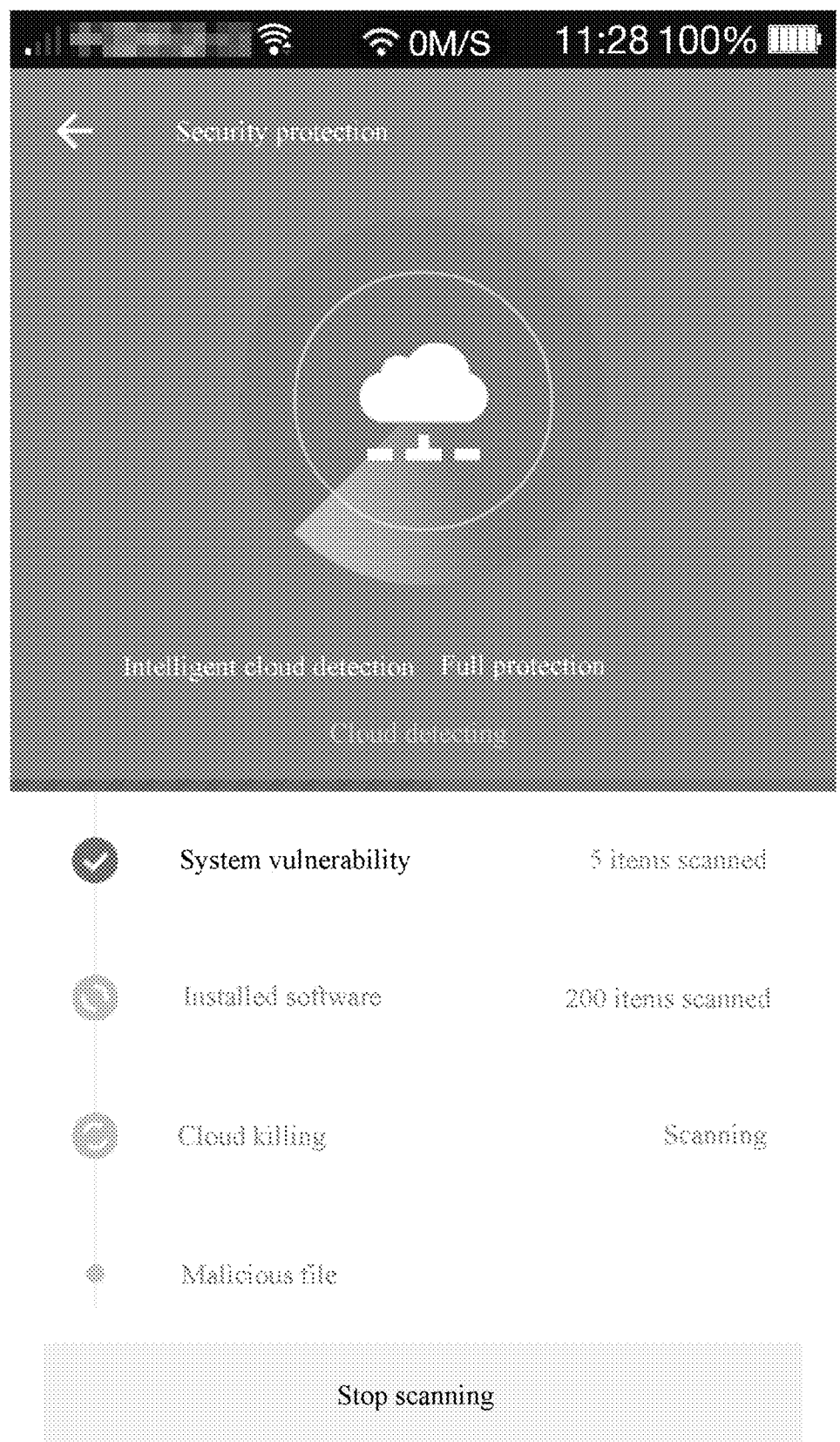
Figure 6:
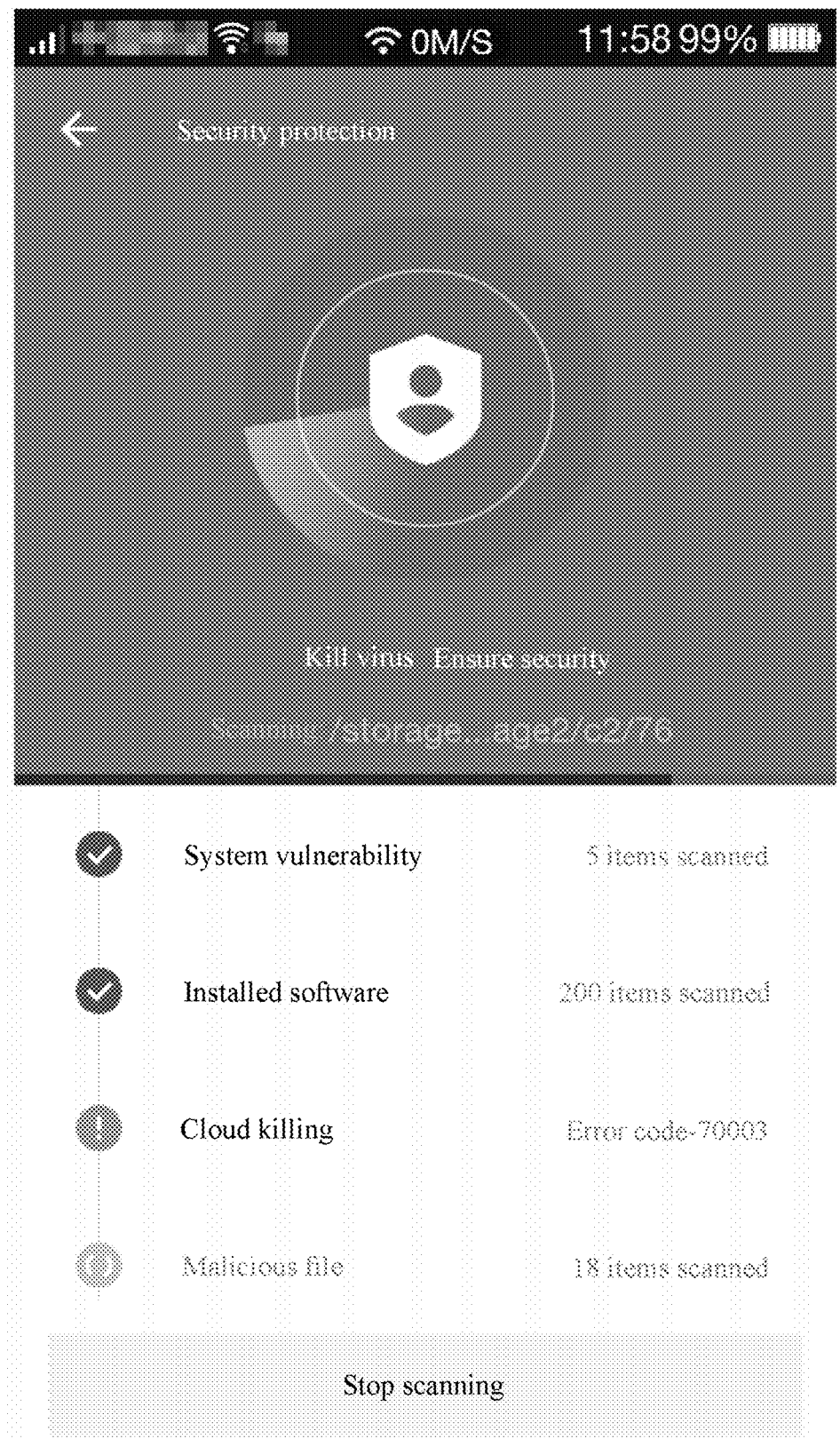
Figure 7:
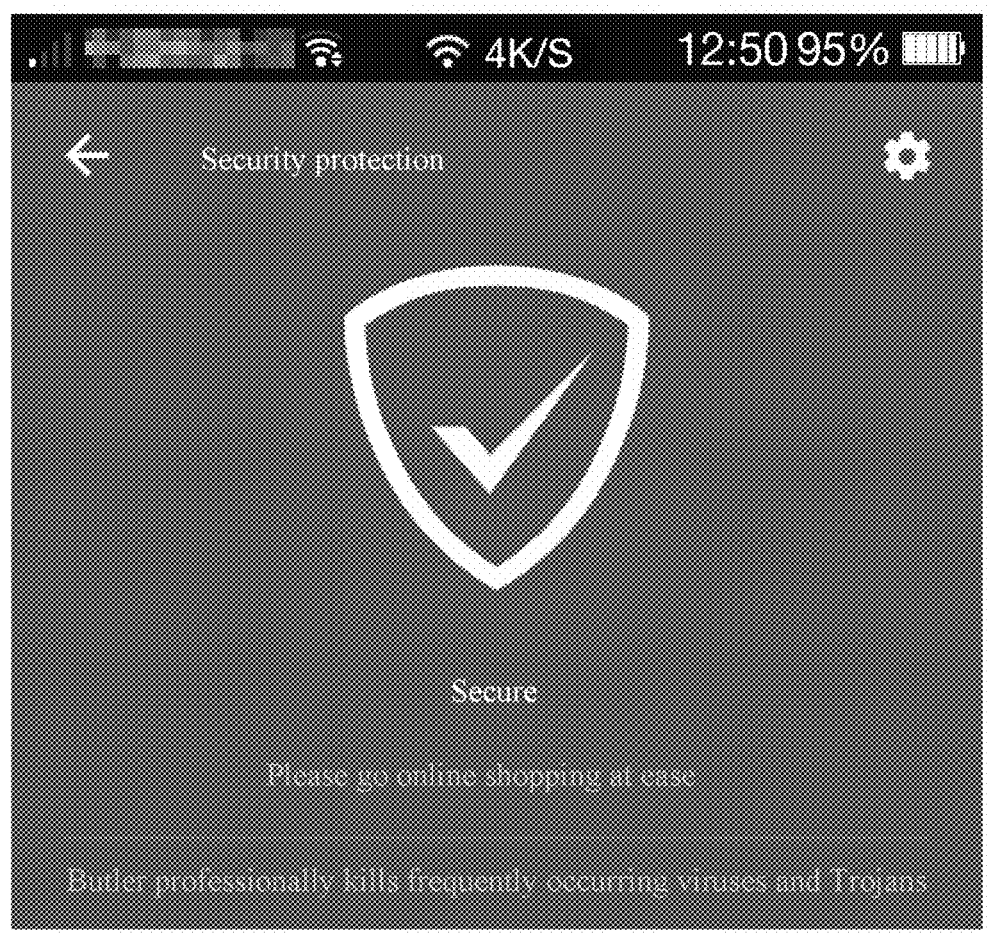

FIG. 2 to FIG. 7 are schematic diagrams of examples of a plurality of UI interfaces of applying an exemplary embodiment. As shown in FIG. 2, a plurality of installed applications are displayed on a user interface of a terminal. A virus killing application, such as Mobile Butler, is found on the user interface of the terminal, and the virus killing application is clicked to start the application, to enter an application interface of the virus killing application shown in FIG. 3 or FIG. 4. The application interface includes a start button, such as "Scan now" in FIG. 3 or "Quick scan" and "full scan" in FIG. 4, for virus killing. Different killing policies may be triggered by means of different start buttons in FIG. 4. For example, quick scanning may denote selecting core contents in the terminal as to-be-detected samples and comparing the selected core contents with, for example, 100,000 virus samples, and full scanning may denote using all contents in the terminal as to-be-detected samples, and comparing all contents with all virus samples (for example, 300,000 virus samples). FIG. 5 and FIG. 6 are interface diagrams of a process of performing virus sample killing on the cloud after the to-be-detected sample is reported by the terminal. An in-application advertisement plug-in, a virus infected file, a virus infected network address, or the like in the terminal may be killed effectively and quickly. The interface after the killing ends is shown in FIG. 7. In this instance, the terminal is not invaded by a virus, and a detection result of virus comparison is secure. If the terminal is invaded by a virus, a detection result of virus comparison would include a to-be-removed virus file or advertisement plug-in, or the like that needs to be processed by a user, and the user performs file removing according to personal requirements.

The example of FIG. 1 is merely a system architecture instance for implementing the exemplary embodiments, and the exemplary embodiments are not limited to the foregoing system structure of FIG. 1. FIG. 2 to FIG. 7 are examples of UI interface diagrams. The exemplary embodiments are not limited to the UI interface diagrams in actual application. Herein, based on the system architecture of FIG. 1, the exemplary embodiments are provided.

Exemplary Embodiment 1

Figure 8A:
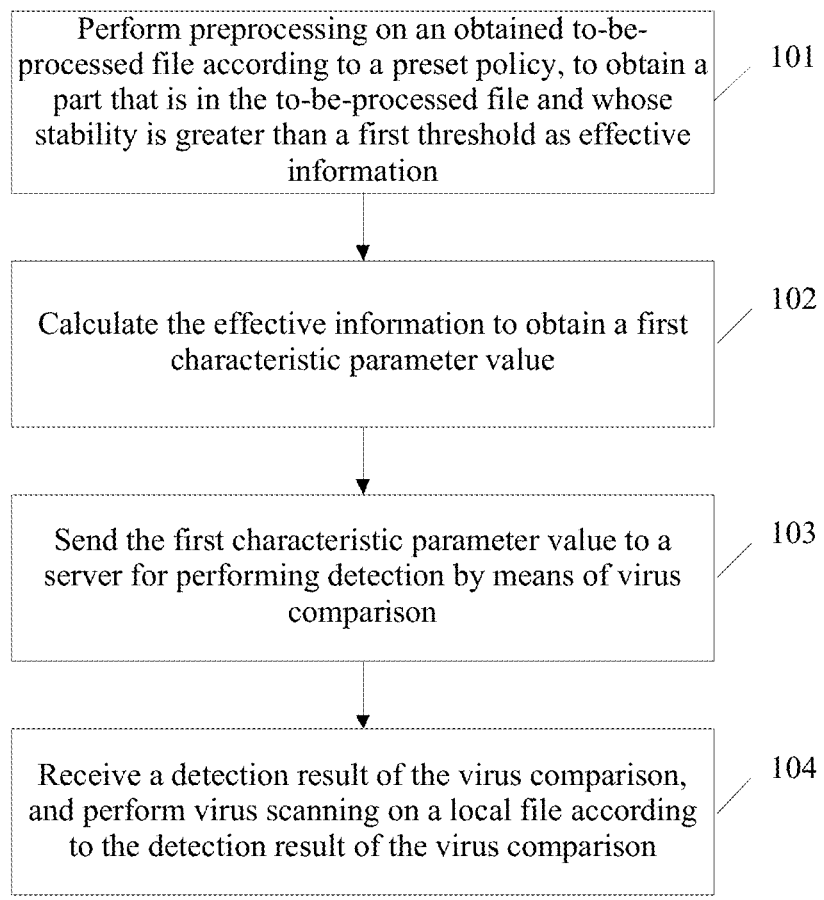
FIGS. 8A and 8B are flowcharts of a virus detection method according to exemplary embodiments.

This exemplary embodiment provides a virus detection method, as shown in FIG. 8A, including:

Step 101: Perform preprocessing on an obtained to-be-processed file according to a preset policy, to obtain a part that is in the to-be-processed file and whose stability is greater than a first threshold as effective information.

According to some exemplary embodiments, a specific application of this step herein is performing preprocessing on a terminal side, to obtain the effective information. A terminal performs preprocessing on an obtained to-be-processed file, that is, a file on which virus detection needs to be performed, according to a preset policy, to obtain effective information against invasion of a virus variant. The effective information has stability. The effective information obtained after the preprocessing is the most stable information in the to-be-processed file, and this type of information is a part that a virus writer can hardly bypass and cannot easily change. Therefore, the information is used as effective information against invasion of a virus variant.

According to some exemplary embodiments, another specific application of this step is: performing preprocessing on a server side, including a preprocessing operation of obtaining effective information, where the effective information is used as a to-be-detected sample; and further including a preprocessing operation of obtaining compared information, where the compared information is used as a virus sample. The two operations may be performed by using a same preprocessing policy, so as to more accurately perform accurate characteristic matching between corresponding characteristics on the to-be-detected sample and the virus sample.

Step 102: Calculate the effective information to obtain a first characteristic parameter value.

According to some exemplary embodiments, an instance of the effective information may be a to-be-detected sample reported by the terminal to the server in FIG. 1. In actual application, fuzzy hash value calculation may be performed on the to-be-detected sample, to report a calculation result, that is, a first fuzzy hash value, to the server for performing virus detection comparison. Distribution of bytes constituting the effective information conforms to a specified rule. The specified rule is that the effective information satisfies the foregoing stability requirement and is the most stable information in the to-be-processed file. The first fuzzy hash value is a first characteristic parameter value calculated by the terminal according to the effective information.

Step 103: Send the first characteristic parameter value to a server for performing detection by means of virus comparison.

Step 104: Receive a detection result of the virus comparison, and perform virus scanning on a local file according to the detection result of the virus comparison.

An objective of detection is virus killing, and a user is prompted on a virus killing application interface of the terminal. Several examples of the virus killing application interface are shown in FIG. 2 to FIG. 7. Different terminal virus killing application interfaces are generated according to different killing policies. For example, virus killing application interfaces of FIG. 3 and FIG. 4 are different. FIG. 4 includes different start buttons, "Quick scan" and "Full scan". Different killing policies may be triggered by means of different start buttons. For example, quick scanning may denote selecting core contents in the terminal as to-be-detected samples and comparing the selected core contents with 100,000 virus samples, and full scanning may denote using all contents in the terminal as to-be-detected samples, and comparing all contents with all virus samples (for example, 300,000 virus samples).

Exemplary Embodiment 2

Figure 8B:
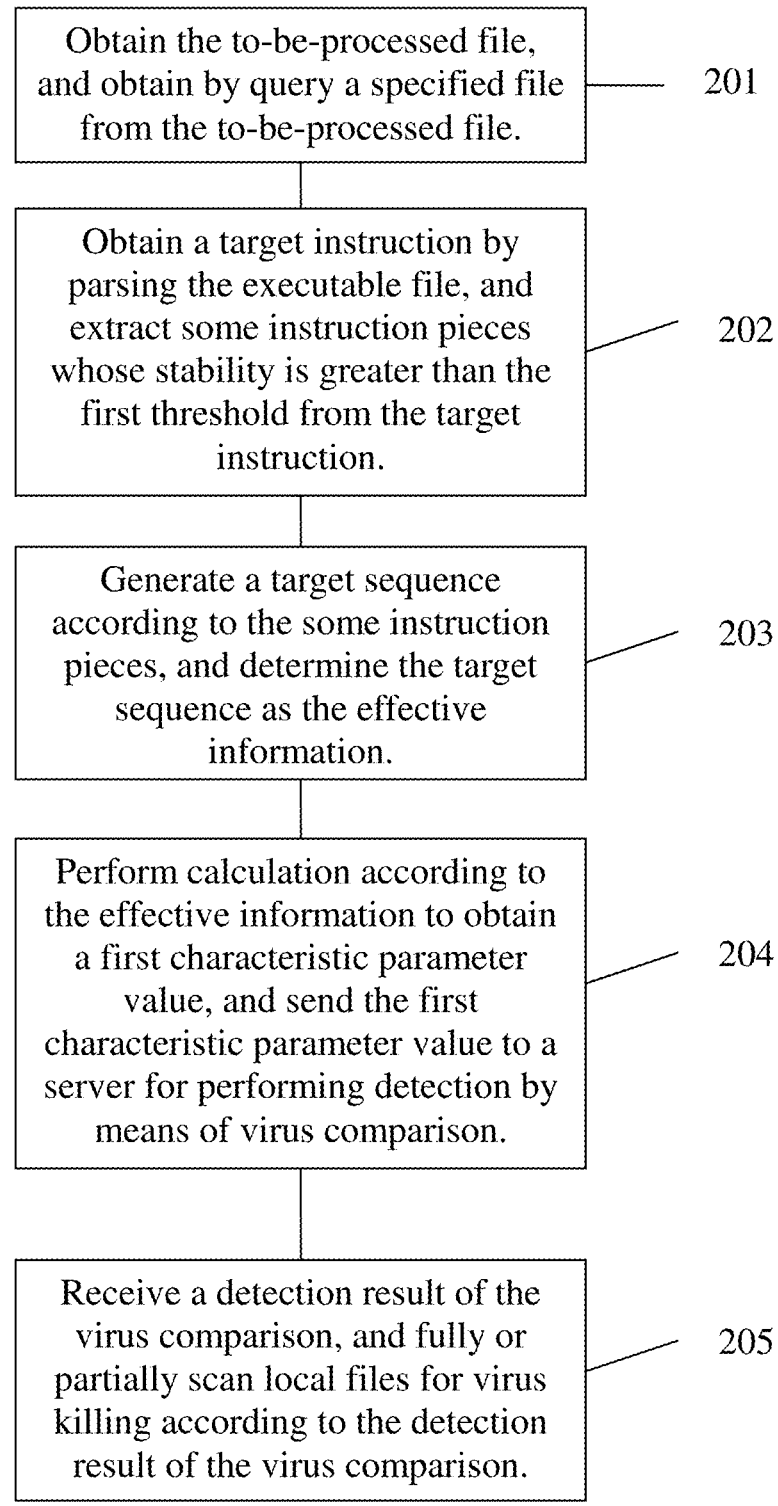

As shown in FIG. 8B, this exemplary embodiment provides a virus detection method, including:

Step 201: Obtain the to-be-processed file, and obtain by query a specified file from the to-be-processed file.

In an example where a terminal system is an Android system, an APK file is obtained as a to-be-processed file, the APK file is an executable file, and a virus usually invades an executable file, to trigger running of the virus. Therefore, key monitoring and virus detection may be first performed on the APK file. Query is performed on the APK file for Dex and SO files. Because multi-protection, such as Dex packing, out-of-order protection, SO packing, and virtual machine instruction protection, is usually performed on the APK file, effectively performing encryption protection on stored data and protecting security of the APK file is a first choice for security hardening of the APK file. Therefore, in this exemplary embodiment, when the processing file is queried for a specified file, Dex and SO files are selected.

Step 202: Obtain a target instruction by parsing the executable file, and extract some instruction pieces whose stability is greater than the first threshold from the target instruction.

Step 203: Generate a target sequence according to the some instruction pieces, and determine the target sequence as the effective information.

With reference to the foregoing step 201, it is considered that a characteristic code having stability be obtained to perform characteristic code matching to detect a virus. Therefore, after the Dex and SO files are selected from to-be-processed file, opcode code parts, that is, code parts of characteristics having the highest stability in the instructions, are extracted from function instructions of the Dex and SO files. Distribution of bytes of the opcode code parts conforms to the specified rule (characteristics having the highest stability in the instruction), and a target sequence is generated according to the opcode parts.

According to the foregoing step 201 to step 203, the performing preprocessing on an obtained to-be-processed file according to a preset policy, to obtain effective information against invasion of a virus variant, may be generating a target sequence according to the opcode parts.

According to some exemplary embodiments, a specific application of this step herein is performing preprocessing on a terminal side, to obtain the effective information. A terminal performs preprocessing on an obtained to-be-processed file (a file on which virus detection needs to be performed) according to a preset policy, to obtain effective information (the target sequence generated according to the opcode parts) against invasion of a virus variant. The effective information (the target sequence generated according to the opcode parts) has stability. The effective information obtained after the preprocessing is the most stable information in the to-be-processed file, and this type of information is a part that a virus writer can hardly bypass and cannot easily change. Therefore, the information is used as effective information against invasion of a virus variant.

According to some exemplary embodiments, another specific application of this step is: performing preprocessing on a server side, including a preprocessing operation of obtaining effective information (the target sequence generated according to the opcode parts), where the effective information (the target sequence generated according to the opcode parts) is used as a to-be-detected sample; and further including a preprocessing operation of obtaining comparison information, where the compared information is used as a virus sample. The two operations may be performed by using a same preprocessing policy, so as to more accurately perform accurate characteristic matching between corresponding characteristics on the to-be-detected sample and the virus sample.

Step 204: Perform calculation according to the effective information to obtain a first characteristic parameter value, and send the first characteristic parameter value to a server for performing detection by means of virus comparison.

According to some exemplary embodiments, a specific application may be performing fuzzy hash calculation on the target sequence, to obtain a first fuzzy hash value, where the first characteristic parameter value includes the first fuzzy hash value.

Figure 9:
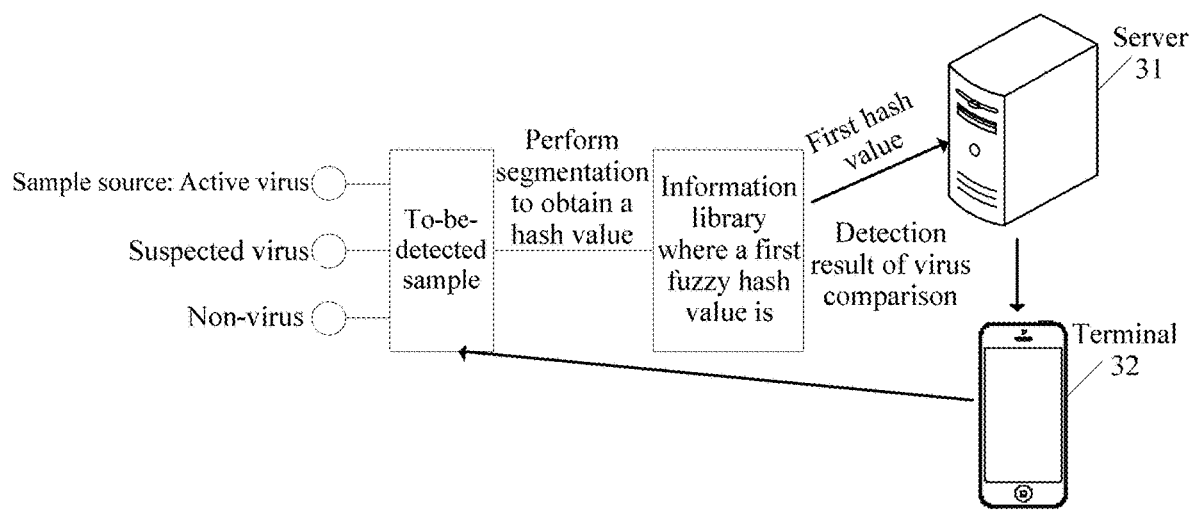
FIG. 9 is a schematic diagram of reporting a first fuzzy hash value by applying an exemplary embodiment.

According to some exemplary embodiments, an instance of the effective information (the target sequence generated according to the opcode parts) may be a to-be-detected sample reported by the terminal to the server in FIG. 1. In actual application, fuzzy hash value calculation may be performed on the to-be-detected sample, to obtain a first fuzzy hash value and report the first fuzzy hash value to the server for performing virus detection comparison. Distribution of bytes constituting the effective information (the target sequence generated according to the opcode parts) conforms to a specified rule (that is, the effective information satisfies the foregoing stability requirement and is the most stable information in the to-be-processed file). The first fuzzy hash value is a first characteristic parameter value calculated by the terminal according to the effective information (the target sequence generated according to the opcode parts), and the terminal sends the first characteristic parameter value to the server for performing virus detection comparison, as shown in FIG. 9. In FIG. 9, a server 31 and a terminal 32 are included. The terminal 32 serves as a source from which the server collects a to-be-detected sample, and a source of the reported sample includes an active virus type, a suspected virus type, and a non-virus type. This exemplary embodiment is merely an example, and in addition to the types, a virus variant, a new virus type, and the like may be further included. The terminal 32 divides the to-be-detected sample into segments to obtain a has value, and after obtaining a first fuzzy hash value, the terminal 32 reports the first fuzzy hash value to the server 31, comparison of virus detection is performed on the server 31 side, and the server 31 feeds back a comparison result of the virus detection to the terminal for presentation.

Step 205: Receive a detection result of the virus comparison, and fully or partially scan local files for virus killing according to the detection result of the virus comparison.

An objective of detection is virus killing, and a user is prompted on a virus killing application interface of the terminal. Several examples of the virus killing application interface are shown in FIG. 2 to FIG. 7. Different terminal virus killing application interfaces are generated according to different killing policies. For example, virus killing application interfaces of FIG. 3 and FIG. 4 are different. FIG. 4 includes different start buttons, "Quick scan" and "Full scan". Different killing policies may be triggered by means of different start buttons. For example, quick scanning may denote selecting core contents in the terminal as to-be-detected samples and comparing the selected core contents with 100,000 virus samples, and full scanning may denote using all contents in the terminal as to-be-detected samples, and comparing all contents with all virus samples (for example, 300,000 virus samples).

In an implementation of this exemplary embodiment, the method further includes: generating the preset policy according to collected known virus characteristic information and trend information of a virus variant, to obtain the effective information against invasion of a virus variant. According to a feature that a virus and a variant thereof perform invasion by using a sequence, utilization of stability of the opcode sequence is chosen to fight against interference of the invasion.

Exemplary Embodiment 3

Figure 10:
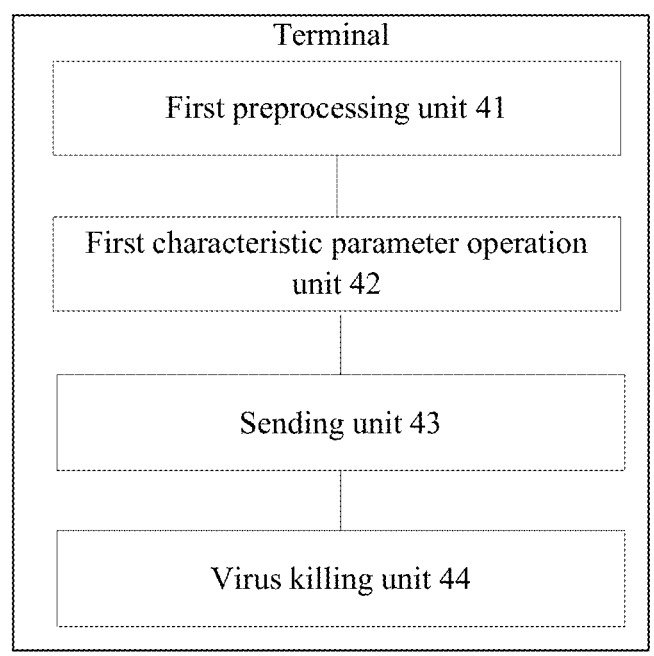
FIG. 10 is a schematic structural diagram of a terminal according to an exemplary embodiment.

A terminal of this exemplary embodiment is provided, as shown in FIG. 10, including: a first preprocessing unit 41, configured to: perform preprocessing on an obtained to-be-processed file according to a preset policy, and use a part that is in the to-be-processed file and whose stability is greater than a first threshold as effective information; a first characteristic parameter operation unit 42, configured to perform calculation according to the effective information to obtain a first characteristic parameter value; a sending unit 43, configured to send the first characteristic parameter value to a server for performing detection by means of virus comparison; and a virus killing unit 44, configured to: receive a detection result of the virus comparison, and perform virus scanning on a local file according to the detection result.

According to some exemplary embodiments, a specific processing process of the first preprocessing unit 41 is that: the first preprocessing unit 41 may be a terminal side, so that preprocessing is performed on the terminal side, to obtain the effective information. A terminal performs preprocessing on an obtained to-be-processed file (a file on which virus detection needs to be performed) according to a preset policy, to obtain effective information against invasion of a virus variant. The effective information has stability. The effective information obtained after the preprocessing is the most stable information in the to-be-processed file, and this type of information is a part that a virus writer can hardly bypass and cannot easily change. Therefore, the information is used as effective information against invasion of a virus variant.

According to some exemplary embodiments, another specific processing process of the first preprocessing unit 41 is that: the first preprocessing unit 41 may be a server side, so that preprocessing is performed on the server side, including: a preprocessing operation of obtaining effective information, where the effective information is used as a to-be-detected sample; and further including a preprocessing operation of obtaining compared information, where the compared information is used as a virus sample. The two operations may be performed by using a same preprocessing policy, so as to more accurately perform accurate characteristic matching between corresponding characteristics on the to-be-detected sample and the virus sample.

According to some exemplary embodiments, an instance of the effective information is a to-be-detected sample reported by the terminal to the server in FIG. 1. In actual application, fuzzy hash value calculation may be performed on the to-be-detected sample, so that the sending unit 43 is configured to report a calculation result (a first fuzzy hash value) to the server for performing virus detection comparison. Distribution of bytes constituting the effective information conforms to a specified rule (that is, the effective information satisfies the foregoing stability requirement and is the most stable information in the to-be-processed file). The first fuzzy hash value is a first characteristic parameter value calculated by the terminal according to the effective information (the to-be-detected sample).

According to some exemplary embodiments, a specific processing process of the virus killing unit 44 is that: because an objective of detection is virus killing, the virus killing unit 44 is configured to receive a detection result of the virus comparison, fully or partially scan local files for virus killing according to the detection result of the virus comparison, and prompt a scanning result to a user on a virus killing application interface of the terminal. Several examples of the virus killing application interface are shown in FIG. 2 to FIG. 7. Different terminal virus killing application interfaces are generated according to different killing policies. For example, virus killing application interfaces of FIG. 3 and FIG. 4 are different. FIG. 4 includes different start buttons, "Quick scan" and "Full scan". Different killing policies may be triggered by means of different start buttons. For example, quick scanning may denote selecting core contents in the terminal as to-be-detected samples and comparing the selected core contents with 100,000 virus samples, and full scanning may denote using all contents in the terminal as to-be-detected samples, and comparing all contents with all virus samples (for example, 300,000 virus samples).

In an implementation of this exemplary embodiment, the first preprocessing unit 41 may be further configured to: obtain the to-be-processed file, and obtain by query an executable file from the to-be-processed file; obtain at least one target instruction by parsing the executable file, and extract some instruction pieces whose stability is greater than the first threshold from the target instruction; and generate a target sequence according to the some instruction pieces, and determine the target sequence as the effective information.

In an implementation of this exemplary embodiment, the second characteristic parameter operation unit 42 may be further configured to perform fuzzy hash calculation on the target sequence, to obtain a first fuzzy hash value, where the first characteristic parameter value includes the first fuzzy hash value.

In an implementation of this exemplary embodiment, the terminal may further include a policy generation unit, configured to generate the preset policy according to collected known virus characteristic information and trend information of a virus variant, to obtain the effective information against invasion of a virus variant.

Exemplary Embodiment 4

Figure 11:
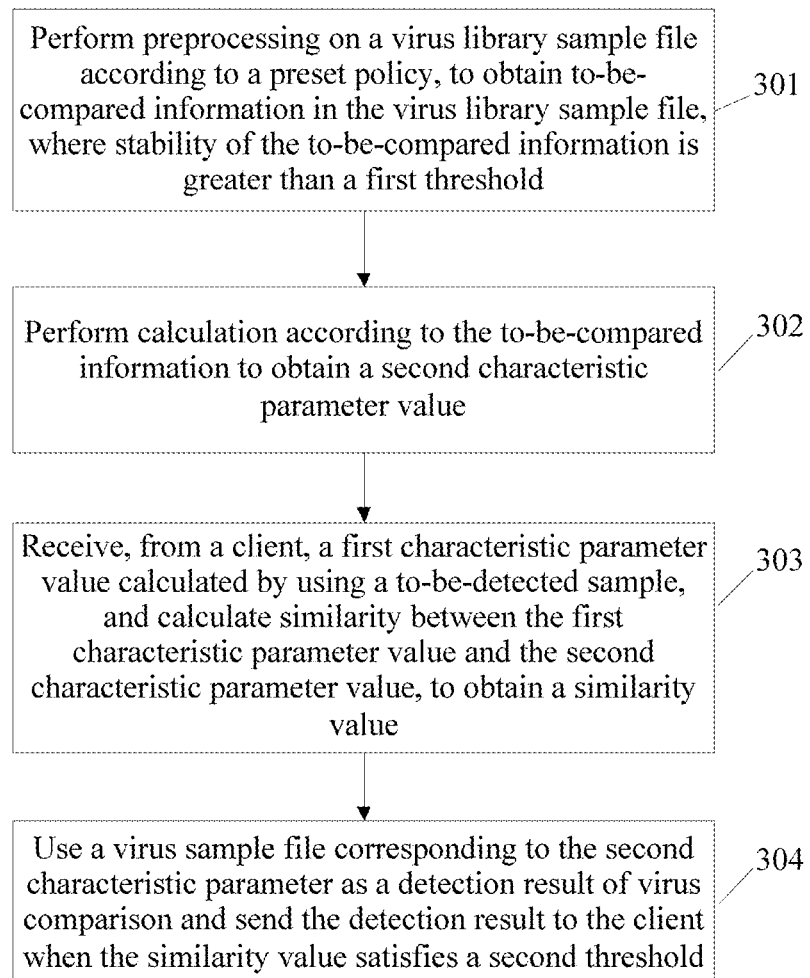
FIG. 11 is a flowchart of a virus detection method according to an exemplary embodiment.

FIG. 11 is a flowchart of a virus detection method according to an exemplary embodiment. Referring to FIG. 11, this exemplary embodiment provides a virus detection method, including:

Step 301: Perform preprocessing on a virus library sample file according to a preset policy, to obtain to-be-compared information in the virus library sample file, where stability of the to-be-compared information is greater than a first threshold.

In some exemplary embodiments, in an example where a terminal system is an Android system, and a virus library sample file is an APK file, the APK file is an executable file, and a virus usually invades an executable file, to trigger running of the virus. Therefore, key monitoring and virus detection may be first performed on the APK file. Query is performed on the APK file for Dex and SO files. Because multi-protection, such as Dex packing, out-of-order protection, SO packing, and virtual machine instruction protection, is usually performed on the APK file, effectively performing encryption protection on stored data and protecting security of the APK file is a first choice for security hardening of the APK file. Therefore, in this exemplary embodiment, Dex and SO files are selected from the APK file to generate compared information. Therefore, after the Dex and SO files are selected from to-be-processed file, opcode code parts are extracted from function instructions of the Dex and SO files. Distribution of bytes of the opcode code parts conforms to the specified rule, and a target sequence is generated as the compared information according to the opcode parts.

Step 302: Perform calculation according to the to-be-compared information to obtain a second characteristic parameter value.

In some exemplary embodiments, a specific application may be using the target sequence as compared information, performing detection of virus comparison on the second fuzzy hash value first calculated by using the compared information and the first fuzzy hash value reported by the terminal, where the first characteristic parameter value includes the first fuzzy hash value.

Step 303: Receive, from a client, a first characteristic parameter value calculated by using a to-be-detected sample, and calculate similarity between the first characteristic parameter value and the second characteristic parameter value, to obtain a similarity value.

In some exemplary embodiments, performing detection of virus comparison on the second fuzzy hash value calculated by using the compared information and the first fuzzy hash value reported by the terminal may be calculating similarity between the two, to obtain a similarity determination result.

Step 304: Use a virus sample file corresponding to the second characteristic parameter as a detection result of virus comparison and send the detection result to the client when the similarity value satisfies a second threshold.

In some exemplary embodiments, when the similarity between the first characteristic parameter value and the second characteristic parameter value satisfies a second threshold, the to-be-detected sample may be added to a decision-to-be-made result list, and after comparison with a specified quantity of or all virus library sample files is ended, if a virus sample having highest similarity with the to-be-detected sample may be selected from the decision-to-be-made result list, a suspected virus is a virus and is used as a detection result of virus comparison, and if a virus sample similar to the to-be-detected sample cannot be selected from the decision-to-be-made result list, the suspected virus is a non-virus and is used as a detection result of virus comparison. Then, the detection result of the virus comparison, is sent to the terminal.

Exemplary Embodiment 5

Figure 12:
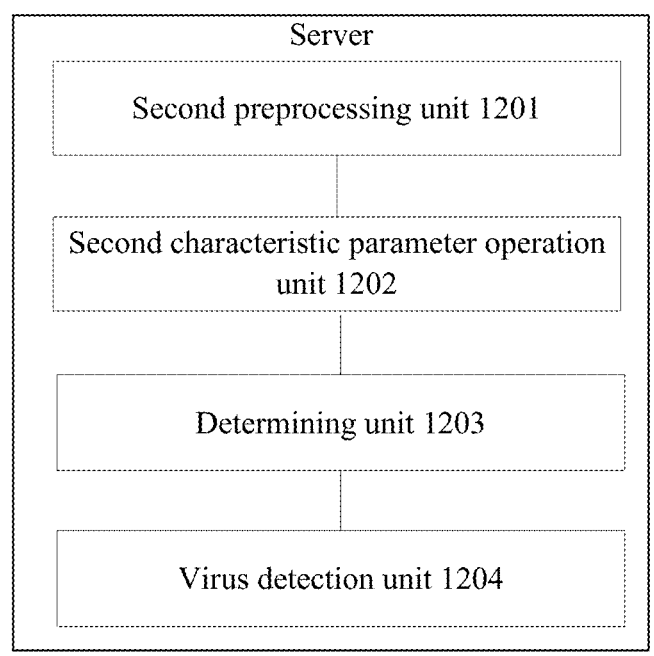
FIG. 12 is a schematic structural diagram of a server according to an exemplary embodiment.

FIG. 12 is a schematic structural diagram of a server according to an exemplary embodiment. Referring to FIG. 12, this exemplary embodiment provides a server, including: a second preprocessing unit 1201, configured to perform preprocessing on a virus library sample file according to a preset policy, to obtain to-be-compared information in the virus library sample file; a second characteristic parameter operation unit 1202, configured to perform calculation according to the to-be-compared information to obtain a second characteristic parameter value; a determining unit 1203, configured to: receive, from a client, a first characteristic parameter value calculated by using a to-be-detected sample, and calculate similarity between the first characteristic parameter value and the second characteristic parameter value, to obtain a similarity value; and a virus detection unit 1204, configured to: use a virus sample file corresponding to the second characteristic parameter as a detection result of virus comparison and send the detection result to the client when the similarity value satisfies a second threshold.

In an implementation of this exemplary embodiment, there may be a plurality of virus library sample files and the virus detection unit 1204 may be further configured to: when similarity between the first characteristic parameter value and one of the plurality of second characteristic parameter values is less than the second threshold, save the first characteristic parameter value and a virus library sample file corresponding to the first characteristic parameter value into a decision-to-be-made result list; calculate similarity between the first characteristic parameter value and another second characteristic parameter value in the plurality of second characteristic parameter values, until comparison with all of the virus library sample files ends; and if the decision-to-be-made result list stores the plurality of second characteristic parameter values and the corresponding plurality of virus library sample files, select a second characteristic parameter value having a minimum similarity value with the first characteristic parameter value, and use a virus sample file corresponding to the second characteristic parameter value as the detection result of the virus comparison and send the detection result to the client.

The second characteristic parameter operation unit 1202 may be further configured to perform fuzzy hash calculation on the to-be-compared information, to obtain a second fuzzy hash value, where the second characteristic parameter value includes the second fuzzy hash value.

Exemplary Embodiment 6

This exemplary embodiment differs from the foregoing exemplary embodiment. In the foregoing exemplary embodiment, the terminal reports an obtained to-be-detected sample after preprocessing, and after hash value calculation is performed on the to-be-detected sample, a hash value of the to-be-detected sample is provided to the server for comparison with a hash value of a virus sample, to implement comparison of virus detection. In this exemplary embodiment, preprocessing, hash value calculation, and the like are all performed on the server, and the terminal is merely used as a source for providing a sample. Because all processing processes are performed on the server, occupation of overheads of the terminal may be avoided.

Figure 13:
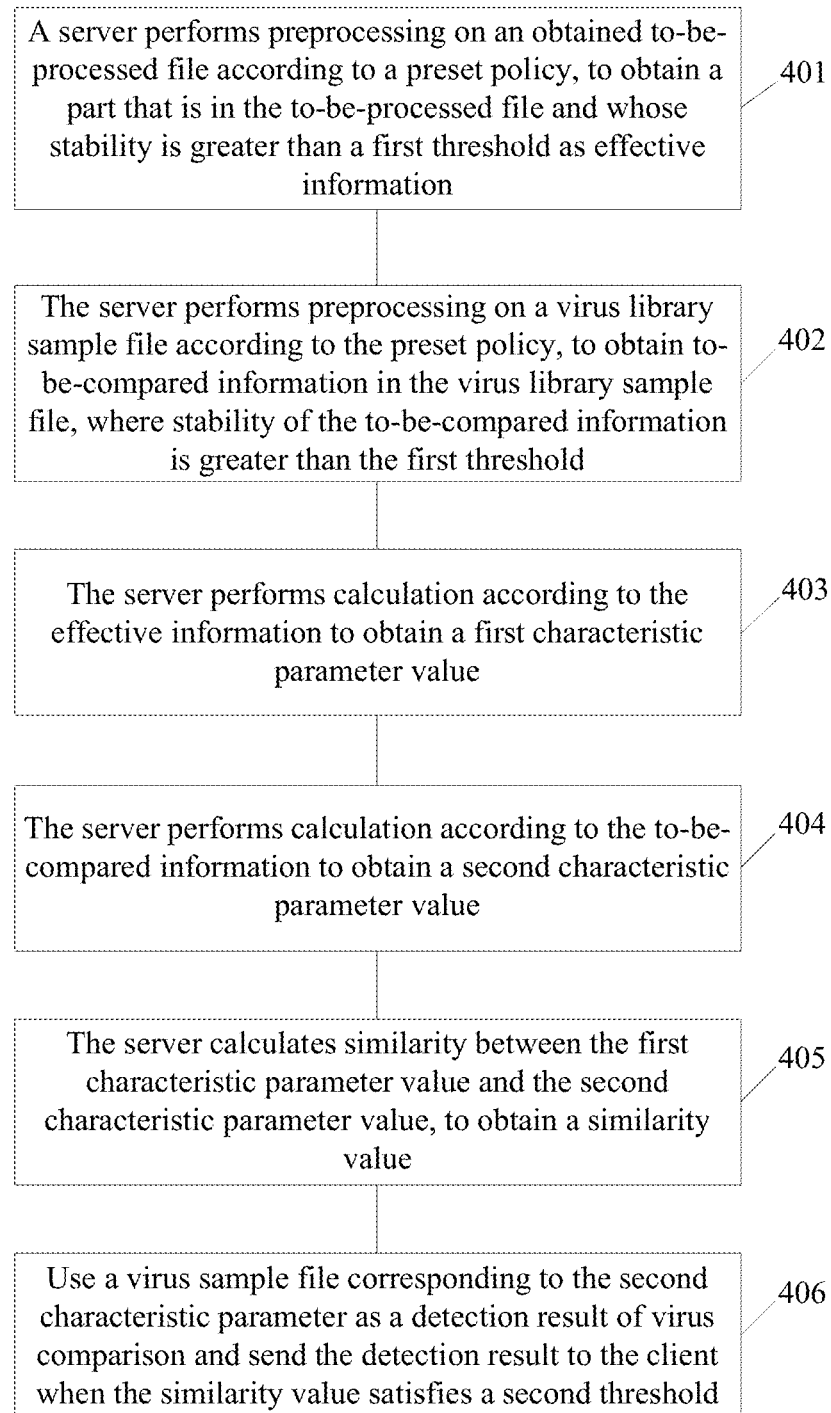
FIG. 13 is a flowchart of a virus detection method according to an exemplary embodiment.

FIG. 13 is a flowchart of a virus detection method according to an exemplary embodiment. Referring to FIG. 13, this exemplary embodiment provides a virus detection method, including:

Step 401: A server performs preprocessing on an obtained to-be-processed file according to a preset policy, to obtain a part that is in the to-be-processed file and whose stability is greater than a first threshold as effective information.

Step 402: The server performs preprocessing on a virus library sample file according to the preset policy, to obtain to-be-compared information in the virus library sample file, where stability of the to-be-compared information is greater than the first threshold.

Step 403: The server performs calculation according to the effective information to obtain a first characteristic parameter value.

Step 404: The server performs calculation according to the to-be-compared information to obtain a second characteristic parameter value.

Step 405: The server calculates similarity between the first characteristic parameter value and the second characteristic parameter value, to obtain a similarity value.

Step 406: Use a virus sample file corresponding to the second characteristic parameter as a detection result of virus comparison and send the detection result to the client when the similarity value satisfies a second threshold.

Exemplary Embodiment 7

Figure 14:
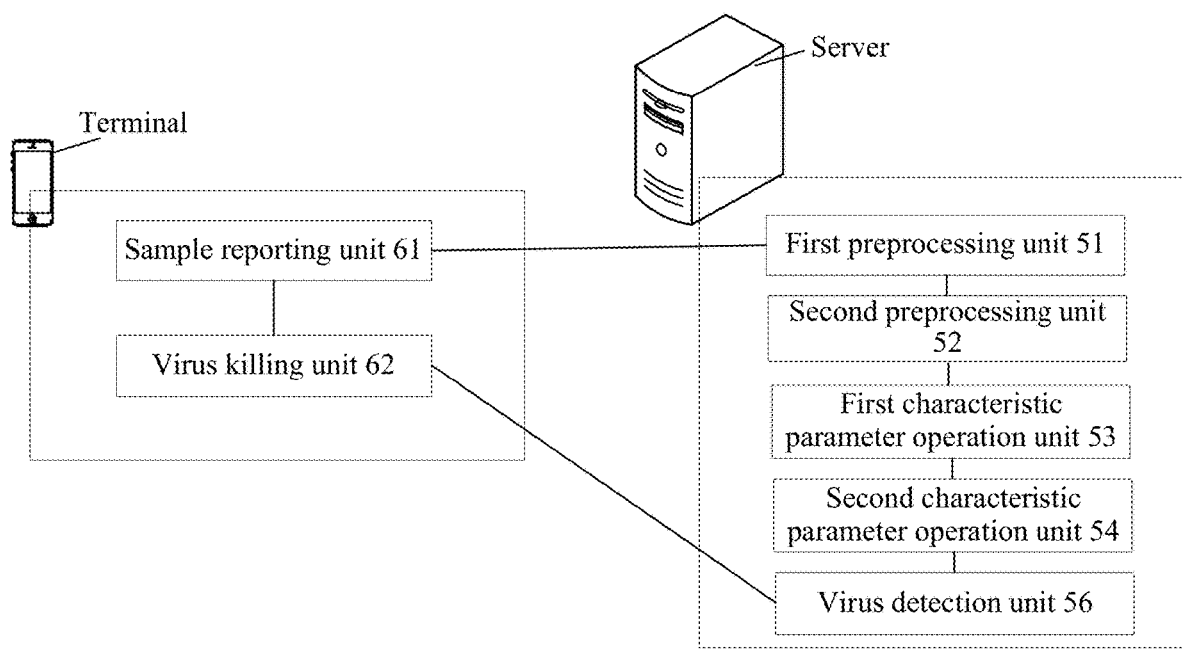
FIG. 14 is a schematic diagram of module interaction according to an exemplary embodiment.

This exemplary embodiment provides a virus detection system, as shown in FIG. 14, including a server and a terminal. The server includes: a first preprocessing unit 51, configured to: perform preprocessing on an obtained to-be-processed file according to a preset policy, and use a part that is in the to-be-processed file and whose stability is greater than a threshold as effective information; a second preprocessing unit 52, configured to perform preprocessing on a virus library sample file according to the preset policy, to obtain to-be-compared information in the virus library sample file, stability of the to-be-compared information being greater than the first threshold; a first characteristic parameter operation unit 53, configured to perform calculation according to the effective information to obtain a first characteristic parameter value; a second characteristic parameter operation unit 54, configured to perform calculation according to the to-be-compared information to obtain a second characteristic parameter value; a determining unit 55, configured to: calculate similarity between the first characteristic parameter value and the second characteristic parameter value, to obtain a similarity value; and a virus detection unit 56, configured to: use a virus sample file corresponding to the second characteristic parameter as a detection result of virus comparison and send the detection result to the client when the similarity value satisfies a threshold. The terminal includes: a sample reporting unit 61, configured to report the to-be-detected sample, where types of the to-be-detected sample, as shown in FIG. 9, may include an active virus, a suspected virus, and a non-virus; and a virus killing unit 62, configured to receive the detection result of virus comparison and fully or partially scan local files for virus killing according to the detection result of the virus comparison.

It should be pointed out that the foregoing terminal may be an electronic device such as a PC or may be a portable electronic device such as a PAD, a tablet computer, and a handheld computer, or may be an intelligent mobile terminal such as a mobile phone, and is not limited to the descriptions herein. The server may be an electronic device constituted by means of a cluster system, where to implement functions of units, the functional units are integrated or disposed separately. Both of the terminal and the server include at least a database for storing data and a processor for data processing or include a storage medium disposed inside the memory or an independently disposed storage medium.

The processor for data processing may be implemented by using a microprocessor, a central processing unit (CPU), a digital signal processor (DSP), or a field-programmable gate array (FPGA) during processing. The program may be stored in a computer readable storage medium. The storage medium includes operation instructions, where the operation instructions may be computer executable code, and steps in a procedure of the information processing method in the foregoing exemplary embodiments are performed by using the operation instructions.

Figure 15:
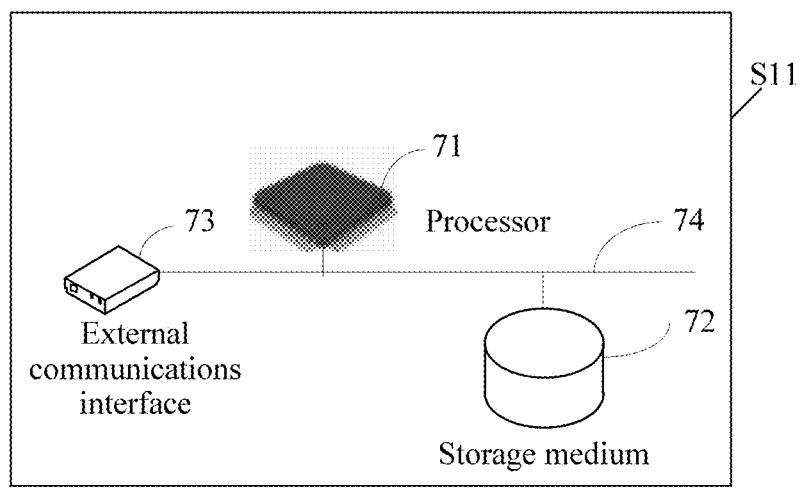
FIG. 15 is a schematic structural diagram of hardware composition of applying an exemplary embodiment.
Figure 16:
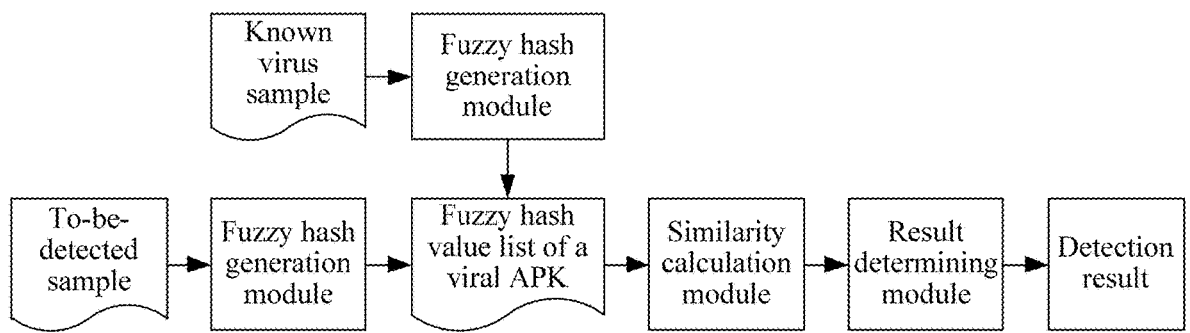
FIG. 16 is a schematic structural diagram of module composition of an application scenario of applying an exemplary embodiment.

The terminal and the server are used as an example of a hardware entity S11 shown in FIG. 15. The apparatus includes a processor 71, a storage medium 72, and at least one external communications interface 73. The processor 71, the storage medium 72, and the external communications interface 73 are connected to each other by using a bus 74.

It should be pointed out that: the foregoing descriptions related to the terminal and server are similar to the foregoing descriptions on the method, and descriptions of beneficial effects are the same as those of the method, and details are not described again. For technical details not disclosed in the terminal and server exemplary embodiments, refer to the descriptions on the method exemplary embodiments.

The exemplary embodiments are described as follows by using an application scenario as an example:

In this application scenario, a technical solution for detecting an Android virus mainly depends on characteristic code matching, and common characteristics include: a hash, a signature, a Package name, a class name in classes.dex, and a function name of an APK file. There are various problems in all of the existing virus detection solutions. For example, 1) identification based on characteristics such as a hash, a signature, a Package name, and a class name is identification based on a simple rule or a digital signature, would be easily bypassed by a virus creator, and causes a problem of missing a malicious program. 2) For a manner of performing identification based on a hash of an APK file, usually used hash algorithms are MD5, SHA1, and the like, and the algorithms are sensitive to an input value. Even a change of only one byte in the APK file would cause a different calculated hash value. Therefore, it would be easy for a virus writer to change a KEY extracted by using a hash algorithm in a manner of mixing up again, adding a new resource file to the APK file, or even modifying code, or the like, to further cause impossibility of identification. 3) A signature-based identification manner may be bypassed by changing a signature. 4) A Package name-based identification manner can also be bypassed by changing a package name. For a manner of performing identification by scanning a class name, on the one hand, only checking a class name would easily cause a false alarm, and on the other hand, this manner can also be easily bypassed by a virus creator in a manner of mixing up or directly changing a class name. Moreover, a changing or mixing up manner, modifying an APK file (for example, adding or deleting a resource, code, or the like), or replacing a signature is very easy to a virus creator. Therefore, it would be easy for a virus writer to create a new virus variant, so as to bypass identification of security software. In view of this, with regard to the problems, a more accurate virus detection technology is needed, so as to effectively kill a virus, for accurately and effectively detecting an Android virus variant, so as to improve security of an APK.

This exemplary embodiment used in the present application scenario may be an opcode similarity-based Android virus detection technology, where a dex file and a so file in an APK file are parsed to obtain instructions of functions therein, parts that easily change in the instructions are skipped, opcode parts that are relatively stable are extracted to constitute a sequence, and then, a fuzzy hash value is calculated according to an opcode sequence of the functions. During sample detection, a fuzzy hash value of a to-be-detected sample is compared with a fuzzy hash value in a virus sample library, if obtained similarity satisfies a threshold, the to-be-detected sample is added to a decision-to-be-made result list, and after comparison with all virus samples is ended, a virus having highest similarity with the to-be-detected sample is selected from the decision-to-be-made result list as a detection result. If the decision-to-be-made list is empty, it indicates that no virus sample similar to the to-be-detected sample is found, and in this case, the detection result is a non-virus. According to the exemplary embodiments, a virus variant that is created by means of a mixing-up or recompiling method and the like and that attempts to bypass security software may be effectively identified, and resource consumption in a virus detection process may be effectively reduced.

Schematic diagrams of a plurality of UIs of using a virus killing application installed on a mobile phone to implement the exemplary embodiments are shown in FIG. 2 to FIG. 7. First, a cloud killing function of the virus killing application is started. For a to-be-detected sample on the mobile phone, the virus killing application generates a fuzzy hash value corresponding to the to-be-detected sample, and sends the fuzzy hash value corresponding to the to-be-detected sample to the cloud (the server side). The cloud (the server side) calculates similarity by using a preset virus library (which is specifically determining similarity between the fuzzy hash value of the to-be-detected sample and a fuzzy hash value in a virus sample library), so as to determine a security status of the to-be-detected sample, and then, returns a detection result of virus comparison to the virus killing application. The virus killing application can perform presentation to a user and process the sample according to requirements.

Diagrams of procedures in technical implementation and information exchange in the system are shown in FIG. 16 to FIG. 20.

The exemplary embodiments are used in the present application scenario, a composition function of a basic module is shown in FIG. 13. Specific functions of each module are described in the following:

I. Fuzzy Hash Generation Module:

a) Partitioning:

An installation package format on the Android platform is an apk format, that is, a standard zip compressed package format, and dex and so files are code executable files in an apk, and are true carriers of malicious code.

A basic format of each instruction in the dex file may be generalized as:

A/OP Index Arg

An OP part in a first piece is used for describing a current instruction type. A is a configuration part and is used for configuring the OP or a parameter used by the OP. Index is an index for calling a function or an index of static data cited by a current instruction, and detailed information corresponding to the function is found by using the index in other parts of the dex file. An Arg part is a definition and an instruction related to a parameter register. It could be learned from actual situations that for different function calls and data operation instructions, a binary content, generated each time, of an instruction in the dex file changes, and binary contents of the Index and Arg parts show randomness for recompilation, generation, and calling of the dex file, according to different compiling and optimizing policies, A also changes, and only the OP part is a relatively stable value content and usually would not change. Similarly, for a so file, an ARM instruction set is usually used, and a basic format of an ARM instruction may be generalized as:

$$<opcode>\{<cond>\}\{S\}<Rd>,<Rn>\{,<opcode2>\}$$

opcode is an instruction mnemonic symbol, that is, an operation code, indicating an operation that an instruction needs to perform, and is required in the instruction.

According to the exemplary embodiments, the dex and so files are parsed to obtain an Opcode sequence of each function as a partition in fuzzy hash calculation.

b) Obtaining a hash value for each partition:

After the file is partitioned, hash calculation may be performed on each partition separately. A conventional hash algorithm may be used, and the MD5 algorithm is used in the exemplary embodiments.

c) Compressing and mapping:

After a hash value is obtained by perform calculation on each file partition, compressing and shortening a result may be chosen. However, such compressing and mapping would lose some accuracy, leading to a false alarm problem. In this disclosure, not performing compression or mapping is chosen, and a result of the MD5 algorithm is reserved.

b) Connecting hash values:

Compressed hash values of all partitions are connected together, so as to obtain a fuzzy hash value of the file.

Figure 17:
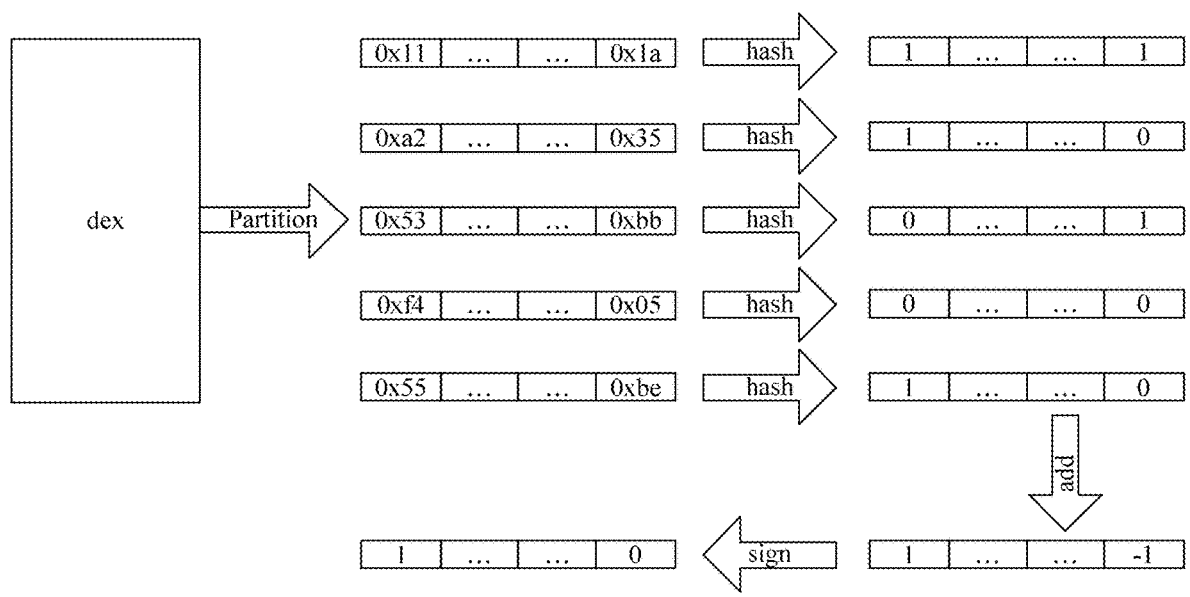
FIG. 17 is a schematic diagram of partition fuzzy hash value calculation of an application scenario of applying an exemplary embodiment.

An entire generation procedure of a partition fuzzy hash value (simhash) algorithm used in the exemplary embodiments is shown in FIG. 17. In some exemplary embodiments, there are many fuzzy hash algorithms, which may be simhash, spamsum, or another fuzzy hash algorithm.

II. Similarity Calculation Module:

In the exemplary embodiments, a Hamming distance is used calculates similarity between two samples. A Hamming distance between a binary string A and a binary string B is a quantity of 1's in the binary system after A xor B.

An example is used as follows:

A=100111;

B=101010;

hamming_distance(A, B)=count_1(A xor B)=count_1 (001101)=3;

After simhash values of two samples are calculated, a condition for determining whether a sample A is similar to a sample B is whether a Hamming distance between A and B is less than equal to N, where a value of N may be selected according to experience or experiments.

III. Result Determining Module:

For a to-be-detected sample, Hamming distances between a fuzzy hash value of the to-be-detected sample and fuzzy hash values of a plurality of samples in the virus library may all be less than our threshold. That is, the detected sample is similar to the plurality of samples in the virus library. In this case, a policy is used to determine a virus id of which virus sample should be selected as a virus id of the detected sample. A policy used in the exemplary embodiments is selecting a virus id of a sample having a smallest distance as result.

Figure 18:
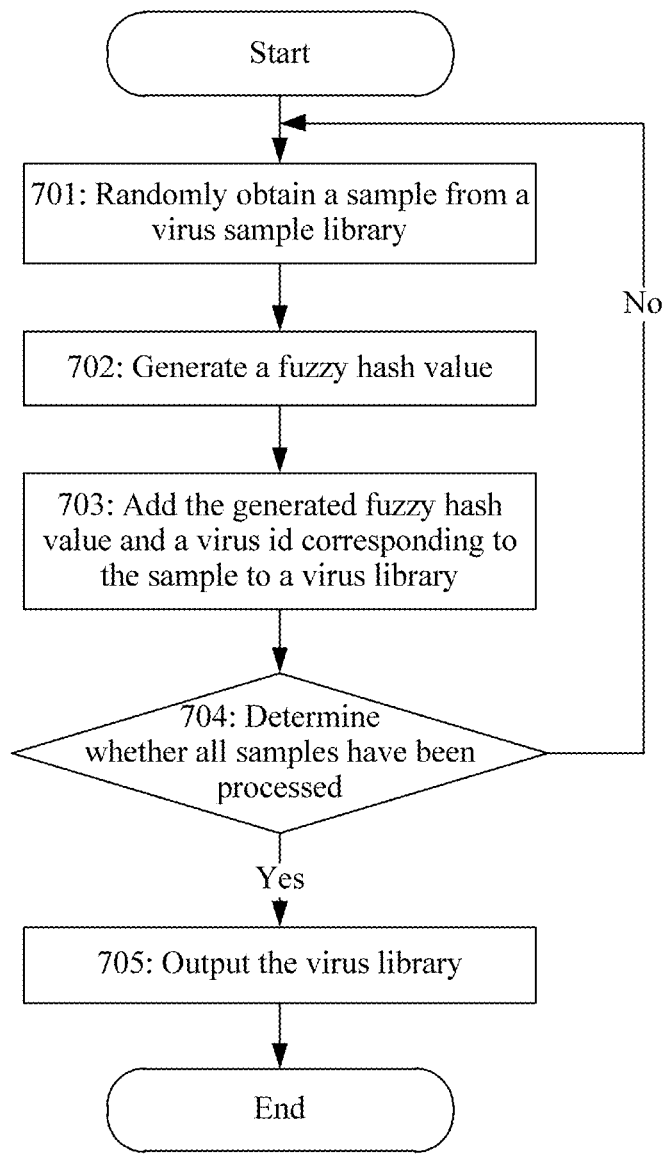
FIG. 18 is a schematic flowchart of virus library generation of an application scenario of applying an exemplary embodiment.
Figure 19:
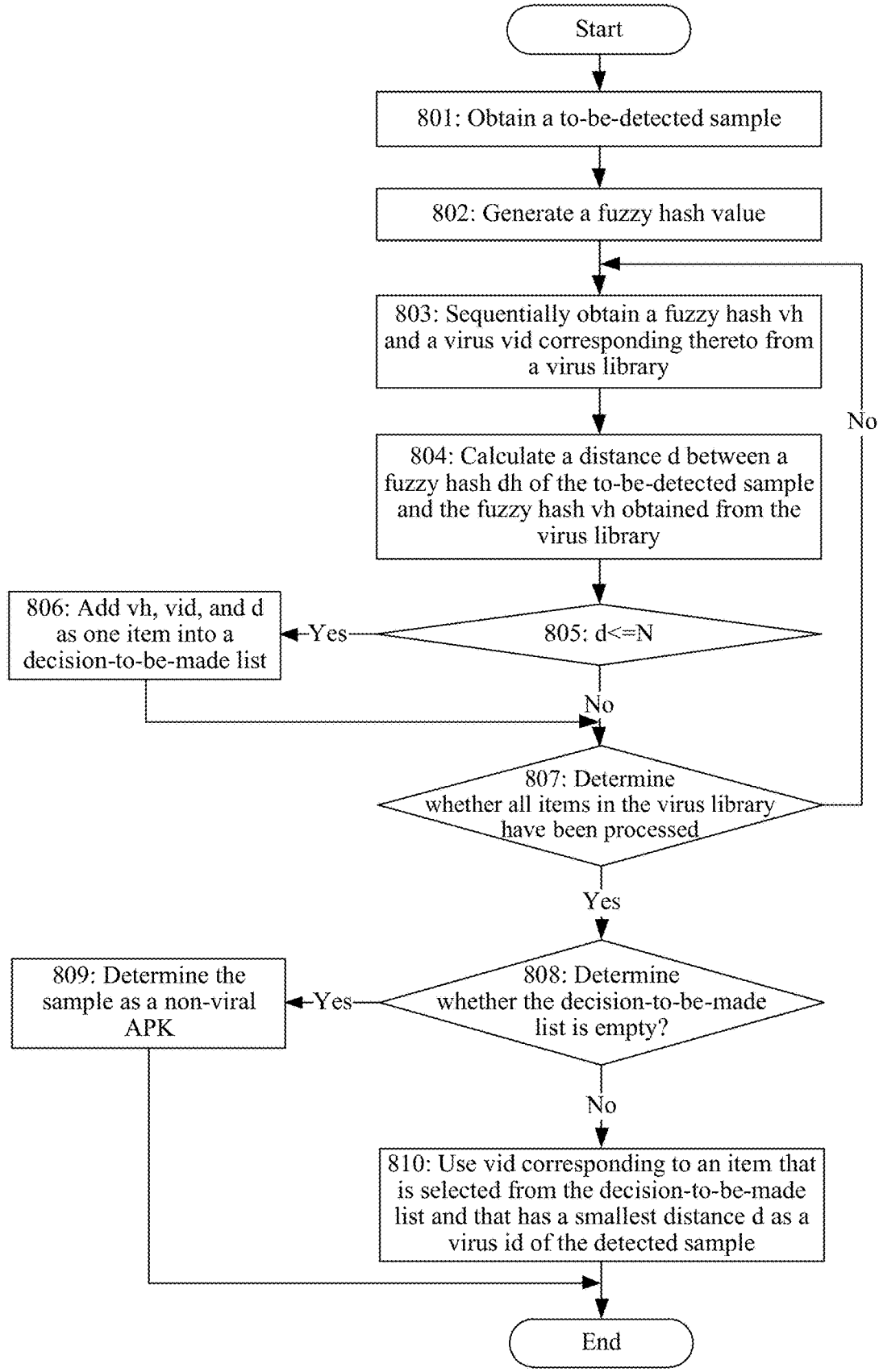
FIG. 19 shows a procedure of virus comparison detection on a to-be-detected sample of an application scenario of applying an exemplary embodiment.

There are mainly two procedures in the exemplary embodiments: a virus library generation procedure shown in FIG. 18 and a virus comparison detection procedure of a to-be-detected sample shown in FIG. 19.

The virus library generation procedure, as shown in FIG. 18, includes:

Step 701: Randomly obtain a sample from a virus sample library.

Step 702: Generate a fuzzy hash value.

Step 703: Add the generated fuzzy hash value and a virus id corresponding to the sample to a virus library.

Step 704: Determine whether all samples have been processed, and if yes, perform step 705; otherwise, perform step 701 again.

Step 705: Output the virus library.

The virus comparison detection procedure of a to-be-detected sample, as shown in FIG. 19, includes:

Step 801: Obtain a to-be-detected sample.

Step 802: Generate a fuzzy hash value.

Step 803: Sequentially obtain a fuzzy hash vh and a virus vid corresponding thereto from a virus library.

Step 804: Calculate a distance d between a fuzzy hash dh of the to-be-detected sample and the fuzzy hash vh obtained from the virus library.

Step 805: Determine whether d is less than or equal to N, and if yes, perform step 806; otherwise, perform step 807.

Step 806: Add vh, vid, and d as one item into a decision-to-be-made list.

Step 807: Determine whether all items in the virus library have been processed, and if yes, perform step 808; otherwise, perform step 803 again.

Step 808: Determine whether the decision-to-be-made list is empty, and if yes, perform step 809; otherwise, perform step 810.

Step 809: Determine the sample as a non-viral APK.

Step 810: Use vid corresponding to an item that is selected from the decision-to-be-made list and that has a smallest distance d as a virus id of the detected sample.

Figure 20:
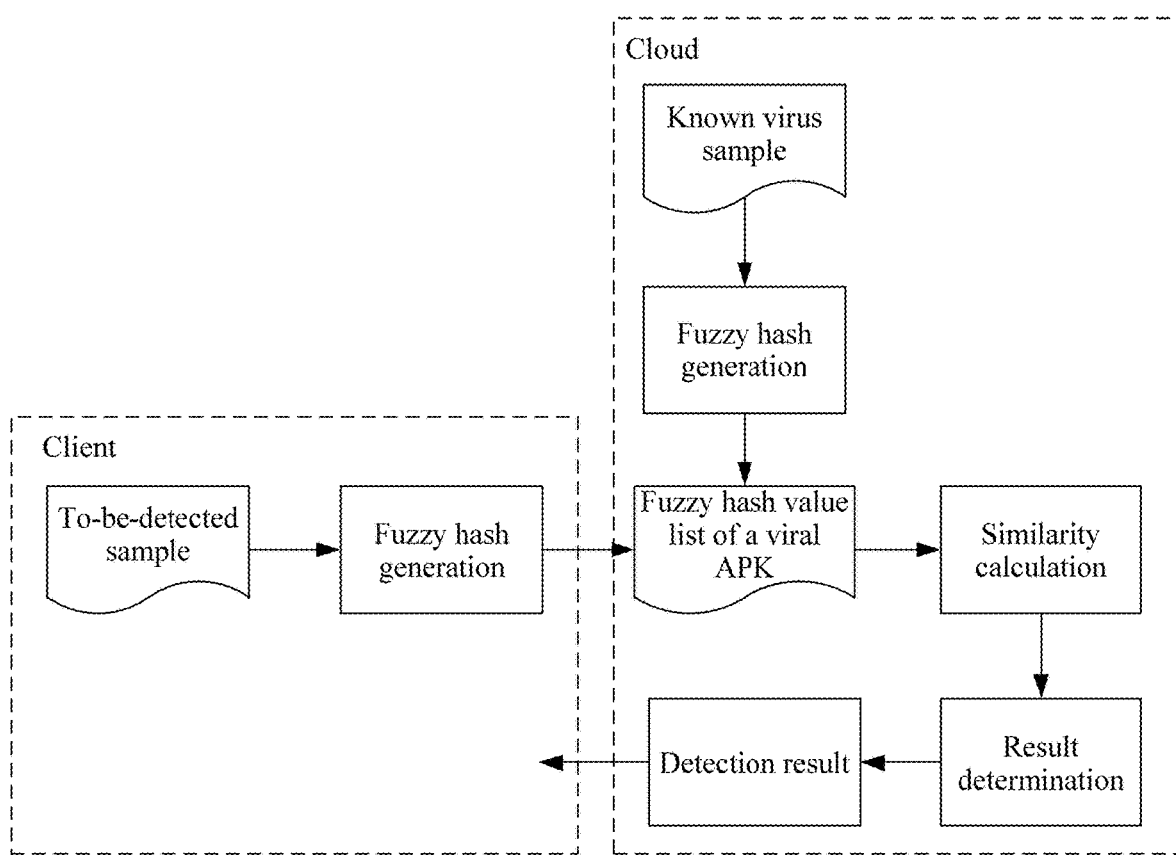
FIG. 20 is a schematic diagram of implementing virus detection in a client+cloud manner of an application scenario of applying an exemplary embodiment.

In the virus detection system of the exemplary embodiments, execution processes may all be processed on the cloud (the server) or may be deployed in a manner of using the terminal (a virus killing application client installed on the terminal) and the could (the server), where a virus library generation procedure and a sample detection procedure are deployed on the cloud, the client is responsible for generating a fuzzy hash value of a to-be-detected sample and sending the fuzzy hash value to the cloud, and after completing detection, the cloud returns a result to the client. In this case, the architecture of the system is shown in FIG. 20. Functions and procedures of modules of the system are consistent with the foregoing ones, and details are not described again.

The exemplary embodiments are used in the present application scenario. A specific implementation is extracting opcode sequences of functions in dex and so files as input partitions of a fuzzy hash, and then, performing comparison by using the fuzzy has to detect an Android virus. Because the opcode sequences have relatively high stability and do not change with other data in the files, the opcode sequences have good contra-variance, so that in the exemplary embodiments, a virus variant may be effectively detected, and accurate detection and virus killing may be performed on a virus.

In the several exemplary embodiments provided in the present application, it should be understood that the disclosed device and method may be implemented in other manners. The described device exemplary embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the exemplary embodiments.

In addition, functional units in the exemplary embodiments may be all integrated in a processing unit, each unit is separately used as a unit, or two or more units are integrated in a unit. The integrated unit may be implemented in a form of hardware, or may be implemented in form of hardware plus a software functional unit.

A person of ordinary skill in the art may understand that, some or all of steps for implementing the method exemplary embodiments may be implemented by using hardware related to a program instruction. The program may be stored in a computer readable storage medium. When the program is executed, the steps including the method exemplary embodiments are performed. However, the storage medium includes various types of media that may store program code, for example, a mobile storage device, a read-only memory (ROM), a random access memory (RAM), a magnetic disk, or an optical disk.

Alternatively, when the integrated unit of the present invention is implemented in a form of a software functional module and sold or used as an independent product, the integrated unit may be stored in a computer-readable storage medium. Based on such an understanding, the technical solutions of the exemplary embodiments essentially, or the part contributing to the prior art may be implemented in a form of a software product. The computer software product may be stored in a storage medium and includes several instructions for instructing a computer device (which may be a personal computer, a server, a network device, or the like) to perform all or some of the methods described in the exemplary embodiments. The foregoing storage medium includes: any media that can store program code, such as a removable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present invention shall be subject to the protection scope of the claims.

What is claimed is:

1. A method comprising:
preprocessing an executable file on which virus detection is to be performed according to a preset policy, to obtain a portion of the executable file which is the most stable portion of the file;
performing a calculation on the portion of the executable file to obtain a first characteristic parameter value;
transmitting the first characteristic parameter value to a server for performing detection by virus comparison; and
receiving a detection result of the virus comparison, and performing virus scanning on a local file according to the detection result,
wherein the preprocessing comprises:
obtaining the executable file, and performing a query on the executable file to obtain at least one of a Dalvik Executable (DEX) file or a Shared Object (SO) file from the executable file;
obtaining at least one target instruction by parsing the at least one of the DEX file or the SO file, and extracting one or more instruction pieces whose stability is greater than a first threshold from the at least one target instruction; and
generating a target sequence according to the one or more instruction pieces, and determining the target sequence as the portion of the executable file.

2. The method according to claim 1, wherein the at least one target instruction is a function instruction in the at least one of the DEX file or the SO file, and the one or more instruction pieces are opcode code parts that implement the function instruction.

3. The method according to claim 1, wherein the performing the calculation comprises:
performing a fuzzy hash calculation on the target sequence, to obtain a first fuzzy hash value,
wherein the first characteristic parameter value comprises the first fuzzy hash value.

4. The method according to claim 3, wherein the method further comprises:
generating the preset policy according to collected known virus characteristic information and collected trend information of a virus variant of a virus for which the virus detection is to be performed.

5. A terminal comprising:
at least one memory configured to store computer program code; and
at least one processor configured to access the at least one memory and operate according to the computer program code, the computer program code including:
first preprocessing code configured to cause the at least one processor to preprocess an executable file on which virus detection is to be performed according to a preset policy to obtain a portion of the executable file which is the most stable part of the executable file;
first characteristic parameter operation code configured to cause the at least one processor to perform a calculation on the portion of the executable file to obtain a first characteristic parameter value;
sending code configured to cause the at least one processor to transmit the first characteristic parameter value to a server for performing detection by virus comparison; and
virus killing code configured to cause the at least one processor to receive a detection result of the virus comparison, and perform virus scanning on a local file according to the detection result,
wherein the preprocessing code is further configured to cause the at least one processor to:
obtain the executable file, and perform a query on the executable file to obtain at least one of a Dalvik Executable (DEX) file or a Shared Object (SO) file from the executable file;
obtain at least one target instruction by parsing the at least one of the DEX file or the SO file, and extract one or more instruction pieces whose stability is greater than a first threshold from the at least one target instruction; and
generate a target sequence according to the one or more instruction pieces, and determine the target sequence as the portion of the executable file.

6. The terminal according to claim 5, wherein the at least one target instruction is a function instruction in the at least one of the DEX file or the SO file, and the one or more instruction pieces are opcode code parts that implement the function instruction.

7. The terminal according to claim 5, wherein the first characteristic parameter operation code is further configured to cause the at least one processor to:
perform a fuzzy hash calculation on the target sequence, to obtain a first fuzzy hash value,
wherein the first characteristic parameter value comprises the first fuzzy hash value.

8. The terminal according to claim 7, wherein the computer program code further comprises:
policy generation code configured to cause the at least one processor to generate the preset policy according to collected known virus characteristic information and collected trend information of a virus variant of a virus for which the virus detection is to be performed.

9. A method comprising:
performing preprocessing on a virus library sample file according to a preset policy, to obtain to-be-compared information in the virus library sample file, a stability of the to-be-compared information being greater than a first threshold;
performing a calculation on the to-be-compared information to obtain a second characteristic parameter value;
receiving, from a client, a first characteristic parameter value calculated from a sample, and calculating a similarity between the first characteristic parameter value and the second characteristic parameter value, to obtain a similarity value; and using the virus sample file corresponding to the second characteristic parameter as a detection result of virus comparison and, in response to the similarity value satisfying a second threshold, transmitting the detection result to the client, wherein the virus library sample file comprises a plurality of virus library sample files; and wherein the using the virus sample file corresponding to the second characteristic parameter as the detection result of virus comparison and sending the detection result to the client when the similarity value satisfies the second threshold comprises:

in response to the similarity between the first characteristic parameter value and one of the plurality of second characteristic parameter values being less than the second threshold, saving the first characteristic parameter value and a virus library sample file of the plurality of virus library sample files that corresponds to the first characteristic parameter value into a result list;

calculating a similarity between the first characteristic parameter value and another second characteristic parameter value in the plurality of second characteristic parameter values until a comparison with all of the plurality of virus library sample files ends; and if the result list stores the plurality of second characteristic parameter values and the corresponding plurality of virus library sample files, selecting a second characteristic parameter value having a minimum similarity value with the first characteristic parameter value, and using a virus sample file corresponding to the second characteristic parameter value as the detection result of the virus comparison and sending the detection result to the client.

10. The method according to claim 9, wherein the performing the calculation comprises:

performing a fuzzy hash calculation on the to-be-compared information, to obtain a second fuzzy hash value, wherein the second characteristic parameter value comprises the second fuzzy hash value.

11. The method according to claim 9, wherein the performing the calculation comprises:

performing a fuzzy hash calculation on the to-be-compared information, to obtain a second fuzzy hash value, wherein the second characteristic parameter value comprises the second fuzzy hash value.

* * * * *